(12) United States Patent
Dai et al.

(10) Patent No.: US 12,363,711 B2
(45) Date of Patent: Jul. 15, 2025

(54) GROUP SCHEDULING REQUESTS AND RESOURCE ASSIGNMENTS

(71) Applicant: Qualcomm Incorporated, San Diego, CA (US)

(72) Inventors: Jing Dai, Beijing (CN); Chao Wei, Beijing (CN); Ruiming Zheng, Beijing (CN); Min Huang, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/774,139

(22) PCT Filed: Nov. 25, 2020

(86) PCT No.: PCT/CN2020/131331
§ 371 (c)(1),
(2) Date: May 3, 2022

(87) PCT Pub. No.: WO2021/104281
PCT Pub. Date: Jun. 3, 2021

(65) Prior Publication Data
US 2023/0034070 A1   Feb. 2, 2023

(30) Foreign Application Priority Data
Nov. 28, 2019   (WO) ................ PCT/CN2019/121435

(51) Int. Cl.
*H04W 72/20* (2023.01)
*H04W 72/121* (2023.01)
*H04W 72/1268* (2023.01)

(52) U.S. Cl.
CPC ......... *H04W 72/20* (2023.01); *H04W 72/121* (2013.01); *H04W 72/1268* (2013.01)

(58) Field of Classification Search
CPC ............... H04W 72/20; H04W 72/121; H04W 72/1268; H04W 4/08
See application file for complete search history.

(56) References Cited

U.S. PATENT DOCUMENTS

| 8,918,111 B2 | 12/2014 | Shin et al. |
| 11,219,054 B2 | 1/2022 | Gulati et al. |

(Continued)

FOREIGN PATENT DOCUMENTS

| WO | WO-2018084646 A1 | 5/2018 |
| WO | WO-2018204131 A1 | 11/2018 |

(Continued)

OTHER PUBLICATIONS

CATT: "DL Control Enhancements for URLLC", 3GPP TSG RAN WG1 Meeting #95, R1-1812628, 3rd Generation Partnership Project (3GPP), Mobile Competence Centre, 650, Route Des Lucioles, F-06921, Sophia-Antipolis Cedex, France, vol. Ran WG1, No. Spokane, USA, Nov. 12, 2018-Nov. 16, 2018, Nov. 11, 2018, 5 Pages, XP051554584, Section 2.2.1, p. 2-p. 3.

(Continued)

*Primary Examiner* — Mandish K Randhawa
(74) *Attorney, Agent, or Firm* — Holland & Hart LLP

(57) ABSTRACT

Methods, systems, and devices for wireless communications are described. A user equipment (UE) may transmit a scheduling request to a base station using the dedicated uplink resources. The UE may transmit the scheduling request to indicate that a group of UEs requests uplink resources for an uplink data transmission. As a result, the UE may receive downlink control information from a base station which includes corresponding uplink resources allocated to the UE based on the scheduling request. The UE may use the allocated uplink resources to transmit uplink data to the base station.

26 Claims, 18 Drawing Sheets

(56) References Cited

U.S. PATENT DOCUMENTS

| | | | |
|---|---|---|---|
| 2018/0124824 A1* | 5/2018 | Lee | H04L 5/0094 |
| 2018/0262311 A1 | 9/2018 | Wang et al. | |
| 2019/0320448 A1 | 10/2019 | Fakoorian et al. | |
| 2021/0092716 A1* | 3/2021 | Su | H04W 72/121 |
| 2021/0377924 A1* | 12/2021 | Lee | H04W 72/044 |
| 2022/0095310 A1* | 3/2022 | Li | H04L 1/0003 |

FOREIGN PATENT DOCUMENTS

| | | |
|---|---|---|
| WO | WO-2019060831 A1 | 3/2019 |
| WO | WO-2019062851 A1 | 4/2019 |

OTHER PUBLICATIONS

MOTOROLA: "Scheduling Request Mechanism for EUTRA Uplink", 3GPP TSG RAN1#51, R1-074599, 3rd Generation Partnership Project (3GPP), Mobile Competence Centre, 650, Route Des Lucioles, F-06921, Sophia-Antipolis Cedex, France, vol. Ran WG1, No. Korea, Oct. 30, 2007, Oct. 30, 2007, 2 Pages, XP050108086, The Whole Document.

Samsung: "DL Control Signaling Overhead Reduction for Low Cost UEs", 3GPP TSG RAN WG1 #82bis, R1-155429, 3rd Generation Partnership Project (3GPP), Mobile Competence Centre, 650, Route Des Lucioles, F-06921, Sophia-Antipolis Cedex, France, vol. Ran WG1, No. Malmo, Sweden, Oct. 5, 2015-Oct. 9, 2015, Oct. 4, 2015, pp. 1-3, XP051002335, Section 2, p. 1-p. 2.

Supplementary European Search Report—EP20892435—Search Authority—The Hague—Oct. 26, 2023 (200816EP).

Fraunhofer Hhi et al., "Resource Allocation for Mode 1 NR V2X", 3GPP TSG RAN WG1 #96bis, R1-1904329, Xi'an, China, Apr. 8-12, 2019, pp. 1-5.

International Search Report and Written Opinion—PCT/CN2020/131331—ISA/EPO—Feb. 20, 2021 (200816WO2).

International Search Report and Written Opinion—PCT/CN2019/121435—ISA/EPO—May 29, 2020 (200816WO1).

* cited by examiner

GROUP SCHEDULING REQUESTS AND RESOURCE ASSIGNMENTS

CROSS REFERENCE TO RELATED APPLICATIONS

The present Application is a 371 national stage filing of International PCT Application No. PCT/CN2020/131331 by Dai et al., entitled "GROUP SCHEDULING REQUESTS AND RESOURCE ASSIGNMENTS," filed Nov. 25, 2020; and claims priority to International Patent Application No. PCT/CN2019/121435 by Dai et al., entitled "GROUP SCHEDULING REQUESTS AND RESOURCE ASSIGNMENTS," filed Nov. 28, 2019, each of which is assigned to the assignee hereof, and each of which is expressly incorporated by reference in its entirety herein.

TECHNICAL FIELD

The following relates generally to wireless communications and more specifically to group scheduling requests and resource assignments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support resource assignment where a network device such as a UE sends a request message to a base station to receive an indication of a set of uplink resources for transmitting uplink data. The base station may provide the UE a scheduling assignment or an uplink grant based on the request.

SUMMARY

The described techniques relate to improved methods, systems, devices, and apparatuses that support group scheduling requests and resource assignments. Generally, the described techniques provide for enabling a user equipment (UE) and base station to reduce signaling overhead and latency associated with group scheduling of UEs within the network.

In some examples, a base station may identify a set of dedicated uplink resources that may be used for transmitting scheduling requests associated with group scheduling, and may transmit an indication (e.g., via downlink control information (DCI)) to a user equipment (UE) of an uplink resource allocation for uplink data transmission. The UE may identify a set of dedicated uplink resources for scheduling requests associated with group scheduling based on receiving the indication from the base station and may transmit a scheduling request (SR) to a base station using the dedicated uplink resources. In some examples, the UE may transmit the SR to indicate a group of UEs that request uplink resources for an uplink data transmission. The base station may receive the SR from the UE, and may determine a group common DCI (GC-DCI) indicating uplink resources allocated to the UE based on the SR. The base station may transmit the GC-DCI to the UE, which may include corresponding uplink resources allocated to the UE based on the SR. The UE may use the set of allocated uplink resources to transmit uplink data to the base station.

A method of wireless communications at a UE is described. The method may include transmitting a scheduling request to a base station, the scheduling request including an indication that a group of UEs request uplink resources for data transmission, receiving, based on the scheduling request, downlink control information from the base station, the downlink control information including an indication of uplink resources allocated to the UE based on the scheduling request, and transmitting uplink data to the base station using the uplink resources allocated to the UE.

An apparatus for wireless communications at a UE is described. The apparatus may include a processor, memory coupled (e.g., operatively, communicatively, functionally, electronically, or electrically) to the processor, and instructions stored in the memory. The instructions may be executable by the processor to cause the apparatus to transmit a scheduling request to a base station, the scheduling request including an indication that a group of UEs request uplink resources for data transmission, receive, based on the scheduling request, downlink control information from the base station, the downlink control information including an indication of uplink resources allocated to the UE based on the scheduling request, and transmit uplink data to the base station using the uplink resources allocated to the UE.

Another apparatus for wireless communications at a UE is described. The apparatus may include means for transmitting a scheduling request to a base station, the scheduling request including an indication that a group of UEs request uplink resources for data transmission, receiving, based on the scheduling request, downlink control information from the base station, the downlink control information including an indication of uplink resources allocated to the UE based on the scheduling request, and transmitting uplink data to the base station using the uplink resources allocated to the UE.

A non-transitory computer-readable medium storing code for wireless communications at a UE is described. The code may include instructions executable by a processor to transmit a scheduling request to a base station, the scheduling request including an indication that a group of UEs request uplink resources for data transmission, receive, based on the scheduling request, downlink control information from the base station, the downlink control information including an indication of uplink resources allocated to the UE based on the scheduling request, and transmit uplink data to the base station using the uplink resources allocated to the UE.

Some examples of the method, apparatuses, and non-transitory computer-readable medium described herein may further include operations, features, means, or instructions for identifying a set of dedicated uplink resources for scheduling requests associated with group scheduling, where the scheduling request may be transmitted to the base station using at least one scheduling request resource of the identified set of dedicated scheduling request resources.

In some examples of the method, apparatuses, and non-transitory computer-readable medium described herein, identifying the set of dedicated uplink resources for scheduling requests associated with group scheduling may include operations, features, means, or instructions for receiving a RRC message configuring the set of dedicated uplink resources for scheduling requests associated with group scheduling.

Some examples of the method, apparatuses, and non-transitory computer-readable medium described herein may further include operations, features, means, or instructions for including a group scheduling indication in the scheduling request.

In some examples of the method, apparatuses, and non-transitory computer-readable medium described herein, the group scheduling indication includes a set of one or more scheduling mode indicator bits associated with group scheduling.

Some examples of the method, apparatuses, and non-transitory computer-readable medium described herein may further include operations, features, means, or instructions for generating the group scheduling indication by applying a cyclic shift associated with group scheduling to a base sequence; where the scheduling request may be transmitted based on the base sequence and the cyclic shift.

Some examples of the method, apparatuses, and non-transitory computer-readable medium described herein may further include operations, features, means, or instructions for generating the group scheduling indication by multiplying a base sequence by a complex-value multiplier associated with group scheduling; where the scheduling request may be transmitted based on the base sequence and the complex-value multiplier.

In some examples of the method, apparatuses, and non-transitory computer-readable medium described herein, the group scheduling indication includes an identifier of the group of UEs.

In some examples of the method, apparatuses, and non-transitory computer-readable medium described herein, the downlink control information includes group common downlink control information indicating an uplink resource assignment for all UEs of the group.

Some examples of the method, apparatuses, and non-transitory computer-readable medium described herein may further include operations, features, means, or instructions for determining the uplink resources allocated to the UE based on the uplink resource assignment for all UEs of the group and an index of the UE.

In some examples of the method, apparatuses, and non-transitory computer-readable medium described herein, receiving the group common downlink control information further may include operations, features, means, or instructions for unscrambling a set of cyclic redundancy check bits based on a group common radio network temporary identifier (GC-RNTI).

In some examples of the method, apparatuses, and non-transitory computer-readable medium described herein, the group common downlink control information indicates a multiplexing scheme including a multi-slot scheduling scheme where each UE of the group of UEs may be allocated uplink resources from a different slot of the uplink resource assignment for all UEs of the group.

In some examples of the method, apparatuses, and non-transitory computer-readable medium described herein, the group common downlink control information indicates a multiplexing scheme including a multiple user multiple input multiple output spatial multiplexing scheme, where each UE of the group of UEs may be associated with a separate orthogonal code domain multiplexed demodulation reference signal.

Some examples of the method, apparatuses, and non-transitory computer-readable medium described herein may further include operations, features, means, or instructions for transmitting a buffer status report on the portion of the uplink resources allocated to the UE.

A method of wireless communications at a base station is described. The method may include receiving a scheduling request from a UE, the scheduling request including an indication that a group of UEs request uplink resources for data transmission, determining, based on the scheduling request, downlink control information for the UE, the downlink control information including an indication of uplink resources allocated to the UE based on the scheduling request, transmitting the downlink control information to the UE, and receiving uplink data from the UE on the uplink resources allocated to the UE.

An apparatus for wireless communications at a base station is described. The apparatus may include a processor, memory coupled (e.g., operatively, communicatively, functionally, electronically, or electrically) to the processor, and instructions stored in the memory. The instructions may be executable by the processor to cause the apparatus to receive a scheduling request from a UE, the scheduling request including an indication that a group of UEs request uplink resources for data transmission, determine, based on the scheduling request, downlink control information for the UE, the downlink control information including an indication of uplink resources allocated to the UE based on the scheduling request, transmit the downlink control information to the UE, and receive uplink data from the UE on the uplink resources allocated to the UE.

Another apparatus for wireless communications at a base station is described. The apparatus may include means for receiving a scheduling request from a UE, the scheduling request including an indication that a group of UEs request uplink resources for data transmission, determining, based on the scheduling request, downlink control information for the UE, the downlink control information including an indication of uplink resources allocated to the UE based on the scheduling request, transmitting the downlink control information to the UE, and receiving uplink data from the UE on the uplink resources allocated to the UE.

A non-transitory computer-readable medium storing code for wireless communications at a base station is described. The code may include instructions executable by a processor to receive a scheduling request from a UE, the scheduling request including an indication that a group of UEs request uplink resources for data transmission, determine, based on the scheduling request, downlink control information for the UE, the downlink control information including an indication of uplink resources allocated to the UE based on the scheduling request, transmit the downlink control information to the UE, and receive uplink data from the UE on the uplink resources allocated to the UE.

Some examples of the method, apparatuses, and non-transitory computer-readable medium described herein may further include operations, features, means, or instructions for identifying a set of dedicated uplink resources for scheduling requests associated with group scheduling, transmitting, to the UE, an indication of the set of dedicated uplink resources for scheduling requests associated with group scheduling, and receiving the scheduling request from the UE on at least one scheduling request resource of the identified set of dedicated scheduling request resources.

In some examples of the method, apparatuses, and non-transitory computer-readable medium described herein, transmitting the indication of the set of dedicated uplink resources for scheduling requests associated with group scheduling may include operations, features, means, or instructions for transmitting a RRC message configuring the set of dedicated uplink resources for scheduling requests associated with group scheduling.

Some examples of the method, apparatuses, and non-transitory computer-readable medium described herein may further include operations, features, means, or instructions for receiving a group scheduling indication in the scheduling request.

In some examples of the method, apparatuses, and non-transitory computer-readable medium described herein, the group scheduling indication includes a set of one or more scheduling mode indicator bits associated with group scheduling.

Some examples of the method, apparatuses, and non-transitory computer-readable medium described herein may further include operations, features, means, or instructions for receiving the scheduling request based on a base sequence and a cyclic shift associated with group scheduling applied to scheduling request at the UE.

Some examples of the method, apparatuses, and non-transitory computer-readable medium described herein may further include operations, features, means, or instructions for receiving the scheduling request based on a base sequence and complex-value multiplier associated with group scheduling used to generate the group scheduling information at the UE.

In some examples of the method, apparatuses, and non-transitory computer-readable medium described herein, the group scheduling indication includes an identifier of the group of UEs.

In some examples of the method, apparatuses, and non-transitory computer-readable medium described herein, the downlink control information includes group common downlink control information indicating an uplink resource assignment for all UEs of the group.

In some examples of the method, apparatuses, and non-transitory computer-readable medium described herein, the uplink resources allocated to the UE may be indicated based on the uplink resource assignment for all UEs of the group and an index of the UE.

In some examples of the method, apparatuses, and non-transitory computer-readable medium described herein, transmitting the group common downlink control information further may include operations, features, means, or instructions for scrambling a set of cyclic redundancy check bits based on a group common radio network temporary identifier (GC-RNTI).

In some examples of the method, apparatuses, and non-transitory computer-readable medium described herein, the group common downlink control information indicates a multiplexing scheme including a multi-slot scheduling scheme where each UE of the group of UEs may be allocated uplink resources from a different slot of the uplink resource assignment for all UEs of the group.

In some examples of the method, apparatuses, and non-transitory computer-readable medium described herein, the group common downlink control information indicates a multiplexing scheme including a multiple user multiple input multiple output spatial multiplexing scheme, where each UE of the group of UEs may be associated with a separate orthogonal code domain multiplexed demodulation reference signal.

Some examples of the method, apparatuses, and non-transitory computer-readable medium described herein may further include operations, features, means, or instructions for receiving a buffer status report on the portion of the uplink resources allocated to the UE

DETAILED DESCRIPTION

In some wireless communications systems, devices such as user equipment (UE) may be grouped together based on various common parameters such as spatial proximity, device type, device capability, and the like. For example, a group of UEs may a group of cellular devices or video monitoring UEs that are grouped together based on close proximity of the devices. In some cases, the group of UEs may coordinate amongst themselves using a number of different techniques, including higher-level signaling from other network devices (e.g., via scheduling from a base station) or by using device-to-device or sidelink communications within the group.

During operation, one or more UEs located within the UE group may identify uplink data to transmit to a base station based on detecting an event (e.g., a monitoring event or triggering event). In some cases, each UE within the group may request resources to transmit uplink data to the network at the same time, for example, in a simultaneous or group transmission. According to some techniques, each UE within the UE group may be configured for individual-UE scheduling, where each UE requests resources by sending a scheduling request (SR) to the network. Such individual UE scheduling between each UE and the network, however, may lead to both increased uplink and downlink control signaling overhead, increased latency, and collisions between UE transmissions.

Using the described techniques of the present disclosure, a UE in a group of UEs may send a scheduling request for the group of UEs to a base station of the network, and the base station may reply with an uplink grant of resources for the entire group. Each UE in the group with data to transmit may then transmit the uplink data on a portion of the resources allocated to the entire group.

Aspects of the disclosure are initially described in the context of wireless communications systems. For example, aspects of the disclosure may be performed by various different network devices, such as UEs and base stations as described herein. Aspects of the disclosure are further illustrated by and described with reference to apparatus diagrams, system diagrams, and flowcharts that relate to group scheduling requests and resource assignments.

Figure 1:
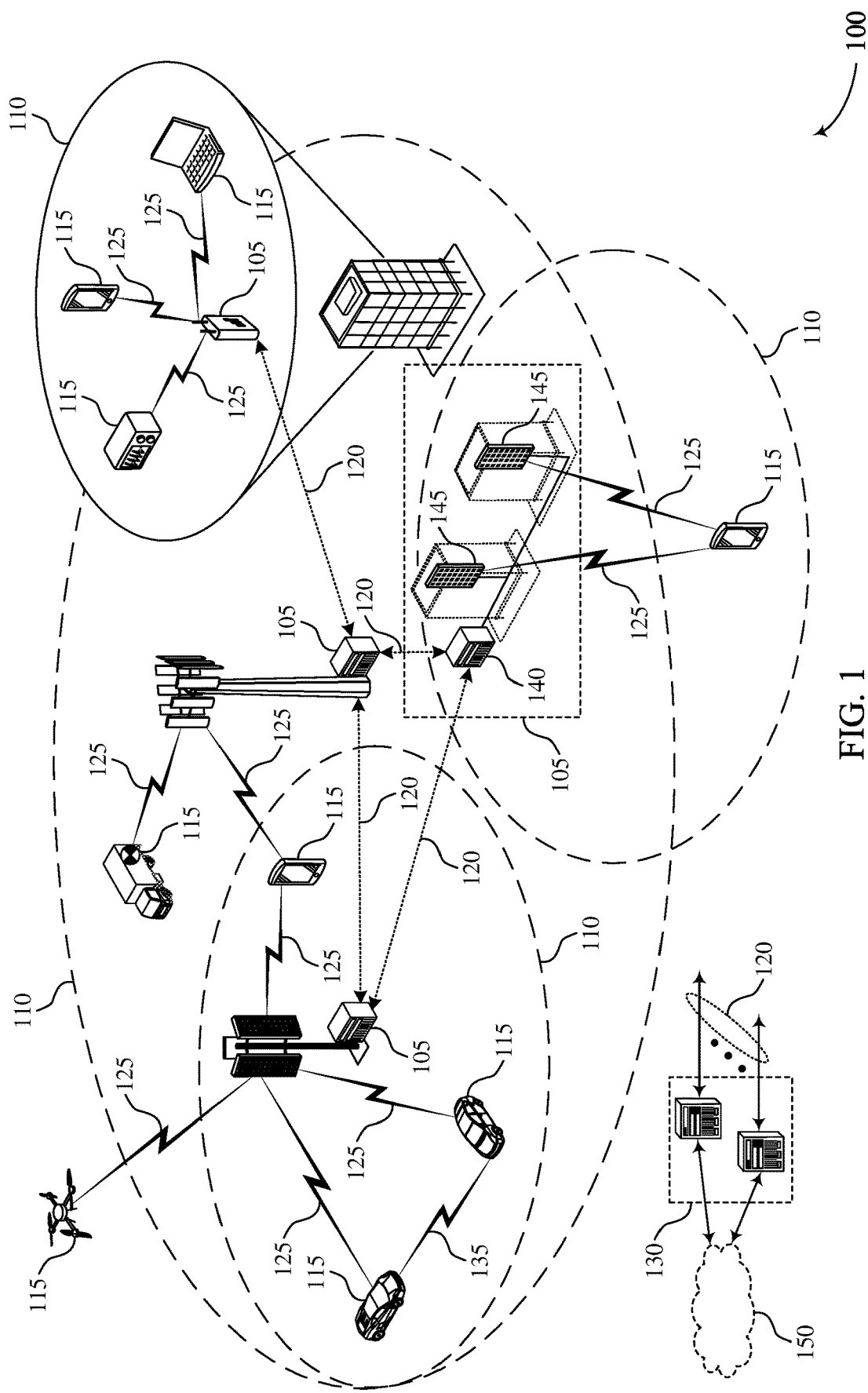
FIG. 1 illustrates an example of a wireless communications system that supports group scheduling requests and resource assignments in accordance with aspects of the present disclosure.

FIG. 1 illustrates an example of a wireless communications system 100 that supports group scheduling requests and resource assignments in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC) and mMTC (massive MTC), and NB-IoT may include eNB-IoT (enhanced NB-IoT) and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include a number of devices such as user equipment (UE) that may be grouped together based on various parameters. For example, the group of UEs 115 may be a surveillance network, where each UE 115 of the UE group is as a video-based monitoring device used, for public services, security applications, or factory monitoring. In some other cases, a group of UEs 115 may be a group of cellular devices that are grouped together based on one or more common parameters.

In some cases, a UE 115 located within the UE group may detect an event (e.g., a monitoring event or triggering event), and may request resources to transmit uplink data to a base station 105 using a scheduling request (SR) based on the detected event. In some cases, each UE 115 within the group may detect the event, which may prompt each UE in the group to request resources to transmit uplink data to the base station 105, for example, individually or in a simultaneous or group transmission. In such cases, the UEs 115 may be configured to support various different SRs and resource assignments associated with group scheduling and group transmissions. For example, a UE 115 may support SRs that are configured for UE-group scheduling, which may in some cases be different than SRs used for single-UE scheduling. In some aspects, the UE 115 may be configured for one or both of single UE scheduling (e.g., single-UE SR) and group UE scheduling (e.g., UE group SR).

In addition, the different types of UE scheduling (e.g., single UE scheduling and group UE scheduling) may be allocated different resources by the base station 105. For instance, in the case of UE-group scheduling, an allocated resource set (e.g., physical uplink control channel (PUCCH) resources) may be included in a group common downlink control message transmitted from the base station 105, where each UE 115 in the UE group receives the common DCI, and may transmit uplink data on the same resources.

Figure 2:
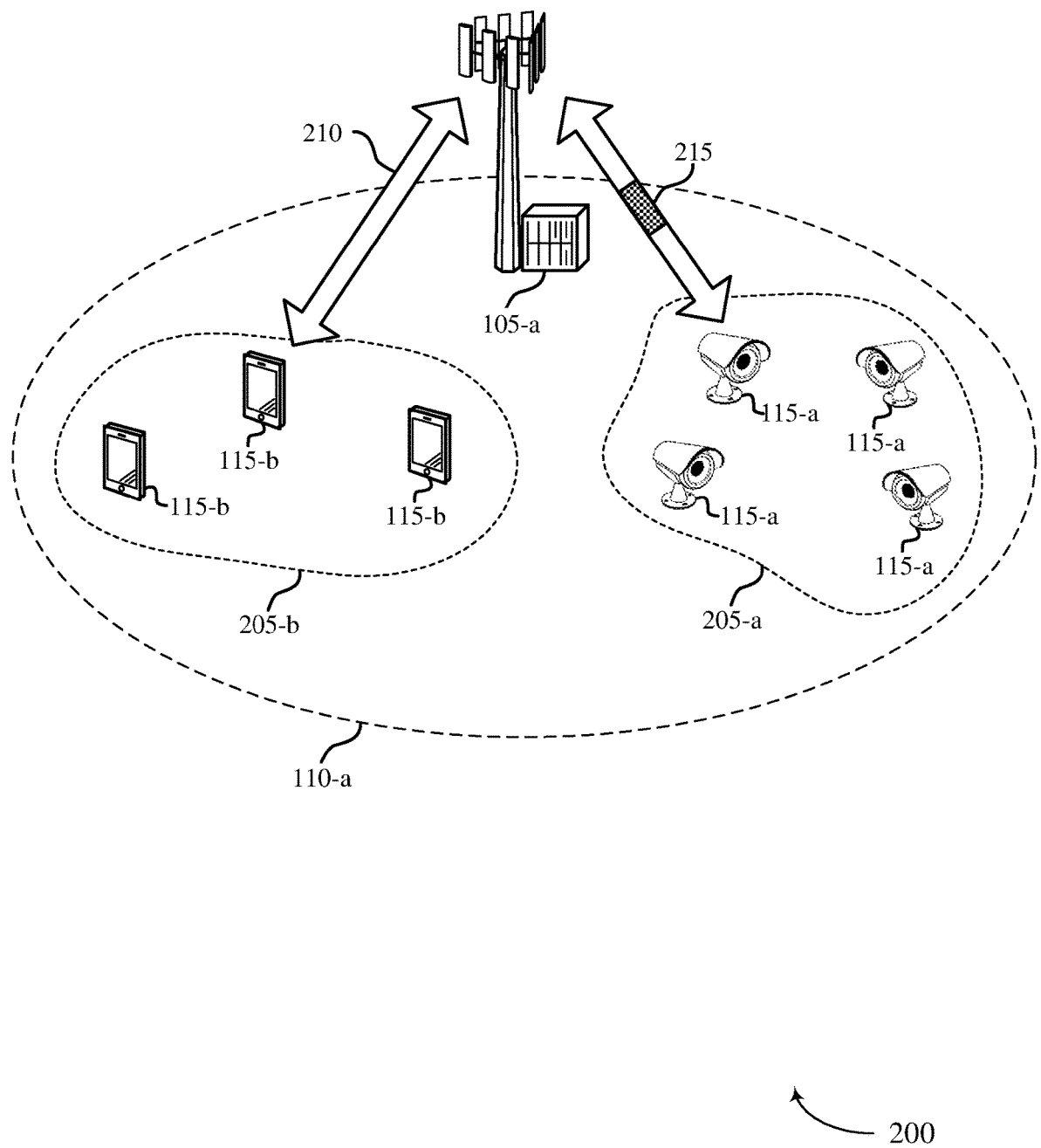
FIG. 2 illustrates an example of a wireless communications system that supports group scheduling requests and resource assignments in accordance with aspects of the present disclosure.

FIG. 2 illustrates an example of a wireless communications system 200 that supports group scheduling requests and resource assignments in accordance with aspects of the present disclosure. In some examples, wireless communications system 200 may implement aspects of wireless communication system 100. For example, wireless communications system 200 may include a base station 105-*a* which may service devices such as UEs 115 located in the network area 110-*a*. Base station 105-*b* and UEs 115-*a* and 115-*b* may be examples of base stations 105 and UEs 115 described with reference to FIG. 1.

In some wireless communications systems, devices such as UE may be allocated to different UE groups 205 based on various parameters such as spatial proximity of the UEs, device type, or device capability. A UE 115 located in a UE group 205 may identify that it has uplink data to transmit to base station 105-*a* based on an event (e.g., a target event such as a monitoring event or triggering event). In some cases, the event may prompt each UE 115 within the UE group 205 to transmit to the base station 105-*a*, for example, individually or in a simultaneous or group transmission.

In one example, a UE 115-*a* located in UE group 205-*a* may be a video monitoring (e.g., surveillance) device such as a video camera and may be an example of a connected device in the wireless system capable of communicating with other wireless devices. The video monitoring UE 115-*a* may implement video-based monitoring applications in public services (e.g., traffic monitoring, safe city applications, or building surveillance), factory services (e.g., plant monitoring, fish farm monitoring, or mining supervising), and other applications. In some cases, the video monitoring UE 115-*a* may be connected to a number of other devices in the network such as other UEs 115-*a* or 115-*b*, and/or base station 105-*a*.

In some cases, a number of UEs such as a group of video monitoring UEs 115-*a* may be indicated as part of the group 205-*a*. For example, the UE group 205-*a* may be a group of video cameras that monitor a given area of a building or factory, where each video camera 115-*a* of the UE group 205-*a* captures a different viewing angle of the given area in order to increase monitoring quality. In some other cases, a group of UEs (e.g., UE group 205-*b*) may be a group of cellular devices 115-*b* that are grouped together based on one or more common parameters (e.g., such as spatial proximity).

In some examples, the detection of an event may trigger the UEs within a given UE group 205 to send uplink data to the base station 105-*a* or other network entity. In some cases, the group of UEs may send the uplink data during the same period of time, or may send the data simultaneously (e.g., on communications link 210) upon detecting a target event or trigger. In one example, one or more video monitoring UEs 115-*a* within UE group 205-*a* may detect an event such as motion in a video monitoring frame, and may notify the base station 105-*a* of the detected motion by sending uplink data to the base station 105-*a*. For example, one or more video monitoring UEs 115-*a* in the UE group 115-*a* may identify an intruder break-in by detecting motion in one or more video monitoring frames. Based on different detection methods (e.g., machine learning, or thermal or motion triggering), the UE group 205-*a* may upload video to the base station 105-*a*, where each UE 115-*a* of the UE group 205-*a* may upload (e.g., transmits uplink data) to the base station 105-*a* simultaneously, or as part of a group transmission.

Such group transmissions or group uploading of data by the UE group 205-*a* may in some cases trigger different events such as alarms (e.g., to a control center), remote monitoring and high definition video uploading, among other events. In some cases, group uplink transmissions from UE group 205-*a* or 205-*b* may be asynchronous (e.g., bursty), as such uplink transmissions may be triggered by the detection of a target event. The detection of an event simultaneously, and corresponding simultaneous uplink transmissions by UEs in the wireless communications network 110-*a*, however, may improve the reliability of security systems by reducing the amount of time and resources used to detect an event and/or receive and process uplink data.

In some cases, a UE 115 and a base station 105 may communicate according to individual-UE scheduling. In such cases, a UE 115 may request resources using a scheduling request (SR) upon identifying uplink data to transmit to the base station 105-a. The base station 105-a may configure resources for the UE 115 to use to transmit the SR. For example, the base station 105-a may allocate a set of PUCCH resources for the UE 115, and may notify the UE 115 of the set of SR resources. The UE 115 may transmit the SR to the base station 105-a using the allocated resources, and the base station 105-a may determine a scheduling assignment including an additional set of resources for the UE 115 to transmit the uplink data. The base station 105 may notify the UE 115 of the allocated uplink resources using the UE-specific DCI 215.

Such individual UE scheduling, however, may lead to increased uplink control signaling overhead due to the resources used to transmit each individual SR. In addition, increased downlink control overhead for sending UE specific DCI may also reduce system efficiency in cases where a large number of UEs are present in a given UE group. Furthermore, scheduling requests transmitted from UEs 115 in the UE group may increase collision rates for PDCCH transmissions carrying the DCI, which may increase latency and decrease overall communications efficiency within the network.

To reduce control channel overhead and the probability of control channel collisions (e.g., physical downlink control channel (PDCCH) collisions), a wireless device such as a UE 115 or base station 105 may be configured to support various different SRs (e.g., different SRs associated with different kinds of uplink transmissions). In addition, SRs and resource assignments may be grouped based on the uplink data transmitted by the UE 115 or by UE group 205. In one case, a UE 115 may support SR resources (e.g., PUCCH resources) and corresponding SR identifiers (IDs) that may be specified for UE-group scheduling. For example, a UE 115 located within a group of UEs 205 may identify data to transmit in a group transmission (e.g., the group transmission being transmitted by the UE 115 simultaneously with other UEs located in the UE group), and the UE 115 may transmit an SR that indicates group scheduling and/or using resources that are allocated for UE-group scheduling.

In some aspects, the SR resources (e.g., PUCCH resources) and/or SR IDs indicated for UE group scheduling may be different than SR resources used for single UE scheduling (e.g., when the UE 115 is not transmitting uplink data as part of a UE group).

In another example, an SR may be associated with a bit value or various different bit values that indicate UE group scheduling or single UE scheduling. For example, in cases where a UE 115 requests to be scheduled (e.g., via a positive SR) an SR may include a single bit indicator, where a first bit value (e.g., "0") may indicate single-UE scheduling, while a second bit value (e.g., "1") may indicate group UE scheduling. In some other cases, a UE may not request to be scheduled (e.g., via a negative SR) and the UE may be configured for discontinuous transmission (DTX).

In some cases, a UE 115 may be configured with different types of SRs (e.g., two or more SRs), and/or may send different types of SRs to the base station 105-a. For example, the UE 115 may be configured for one or both of single UE scheduling (e.g., single-UE SR) and group UE scheduling (e.g., UE group SR). In some cases, the UE 115 may determine to transmit a group SR or a single-UE SR based on UE implementation and depending on application. For example, the UE 115 may determine to transmit a group SR or a single-UE SR based on the event that the UE 115 (e.g., a surveillance camera UE) detects. In some cases, the UE 115 may detect an urgent event (e.g. an intruder breaks into the building monitored by a group of UEs), and the UE 115 may trigger a group of nearby cameras to upload videos to the monitoring room. In such cases, the UE 115 may determine to transmit a group SR. In some other cases, the UE 115 may identify a less urgent event, for example, the UE 115 may identify a security guard in the break in area, and may only trigger the transmission of a single-UE SR.

In one example, the different types of UE scheduling (e.g., single UE scheduling and group UE scheduling) may be associated with different PUCCH resources or different SR IDs assigned by the base station 105-a. For instance, in the case of UE-group scheduling, the allocated resource set (e.g., PUCCH resources) and corresponding SR IDs may be included in a configuration message such as DCI transmitted from the base station 105-a. In some other cases, the allocated resource set may be pre-defined by one or more network specifications.

In some other examples described herein, a device may configure an SR to include a number of identifying SR bits. In such examples, each SR bit included in the SR may indicate different scheduling types supported or requested by a UE 115. For example, an SR may include a one-bit indicator, a two-bit indicator, or another indicator containing a different number of bits. In some examples where the SR includes a one-bit indicator associated with scheduling type, a bit value of 1 may indicate group scheduling and a bit value of 0 may represent single UE scheduling. In some other examples where the SR includes a two-bit indicator, bit vales of 00 and 01 may indicate single UE scheduling, and bit values 10 and 11 may indicate UE group scheduling.

For two bit SR indicators, in some cases, the first bit value may identify group scheduling (e.g., the first bit being a 1 may indicate group scheduling and the first bit being a 0 may indicate single-UE scheduling) and the second bit value may specify different groups the UE is associated with (e.g., the second bit being a 0 may indicate that the UE is part of a first UE group, and the second bit being a 1 may indicate that the UE is a part of a second UE group). In some examples, the determination of whether the UE transmits a group SR indicating a first or a second UE group may be based on UE implementation and may depend on application (e.g., depending on the event that the UE (such as a surveillance camera UE) detects).

In addition, different SRs may be configured according to different control channel (e.g., PUCCH) formats, where an SR may be generated by multiplying a base sequence by a complex-value multiplier associated with group scheduling. For example, according to a first PUCCH format (e.g., PUCCH format 1; PF1) a UE 115 may identify a parameter (e.g., d(0)) to carry information for UE group scheduling. In some cases, d(0) may be a binary phase shift keying (BPSK) complex-value symbol to which the SR indicator bits (e.g., SR bit string) are mapped for a single bit SR with PF1. In some other cases, d(0) may be a quadrature phase shift keying (QPSK) complex-value symbol to which the SR indicator bits (e.g., SR bit string) are mapped for a two-bit SR for PF1.

According to another control channel format (e.g., PUCCH format 0, PF0), the UE 115 may use a different parameter such as an $m_{cs}$ parameter for carrying the information for UE group scheduling. The $m_{cs}$ parameter is selected based on various parameters such as group information and may in some cases be a predetermined value. In some examples, for a single bit SR according to PF0, $m_{cs}=0$ for an SR bit value of 0, and $m_{cs}=6$ for an SR bit value of 1. In some other examples, for a two bit SR according to PF0, $m_{cs}=0$ for SR bit values of 00, $m_{cs}=3$ for SR bit values of 01, $m_{cs}=6$ for SR bit values of 10, and $m_{cs}=9$ for SR bit values of 11.

According to some aspects, PF0 is determined by a low-PAPR sequence defined as:

$$r_{u,v}^{(\alpha,\delta)}(n), n=0,1,\ldots,N_{sc}^{RB}-1 \text{ and } N_{sc}^{RB}=12$$

where $r_{u,v}^{(\alpha,\delta)}(n)$ is given by the low-PAPR sequence: $r_{u,v}^{(\alpha,\delta)}(n)=e^{j\alpha n}\bar{r}_{u,v}(n)$, $\bar{r}_{u,v}(n)$ is a base sequence pre-defined by specification, and $\alpha$ is the cyclic shift given by:

$$\alpha = \frac{2\pi}{N_{sc}^{RB}}\left((m_0 + m_{cs} + n_{cs}) \bmod N_{sc}^{RB}\right)$$

Accordingly, $n_{cs}$ is determined by the slot number in the radio frame and the OFDM symbol index in the slot, $m_0$ is the initial cyclic shift pre-configured by RRC or pre-defined by specification, $m_{cs}=0$ except in some cases for PF0 (e.g., in cases where $m_{cs}$ may be used to represent the value of an SR bit string). In addition, PF1 may be determined by the low-PAPR sequence described herein multiplied by complex-value symbol d(0), which may be defined as:

$$d(0)\cdot r_{u,v}^{(\alpha,\delta)}(n).$$

Figure 3A:
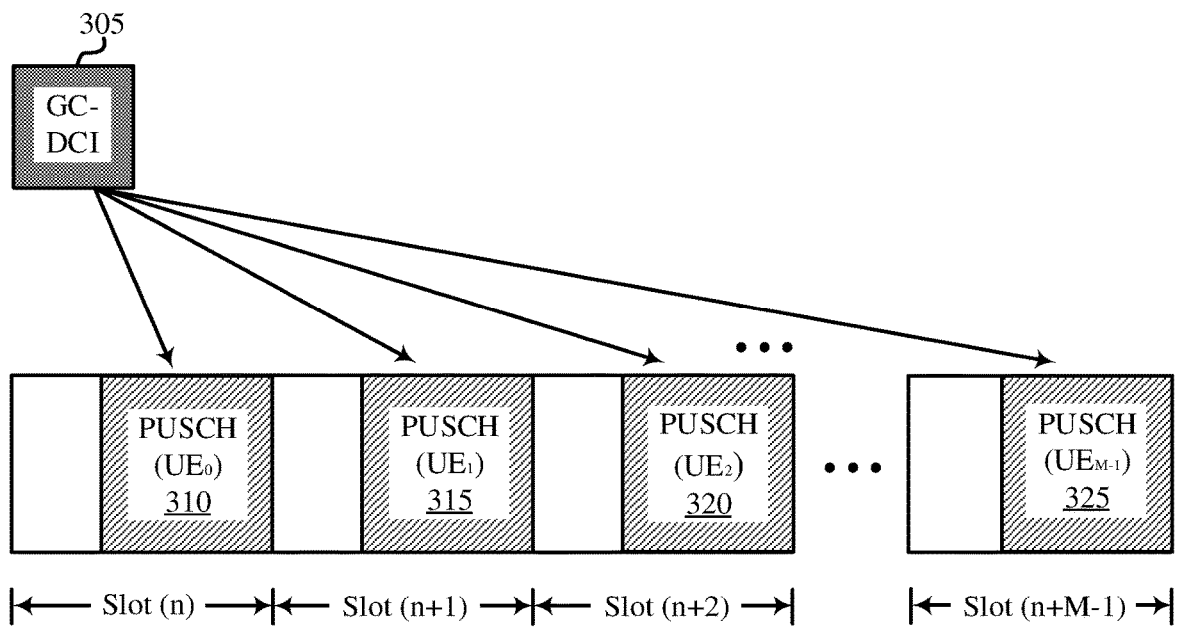
FIGS. 3A and 3B illustrate examples of multiplexing schemes that support group scheduling requests and resource assignments in accordance with aspects of the present disclosure.
Figure 3B:
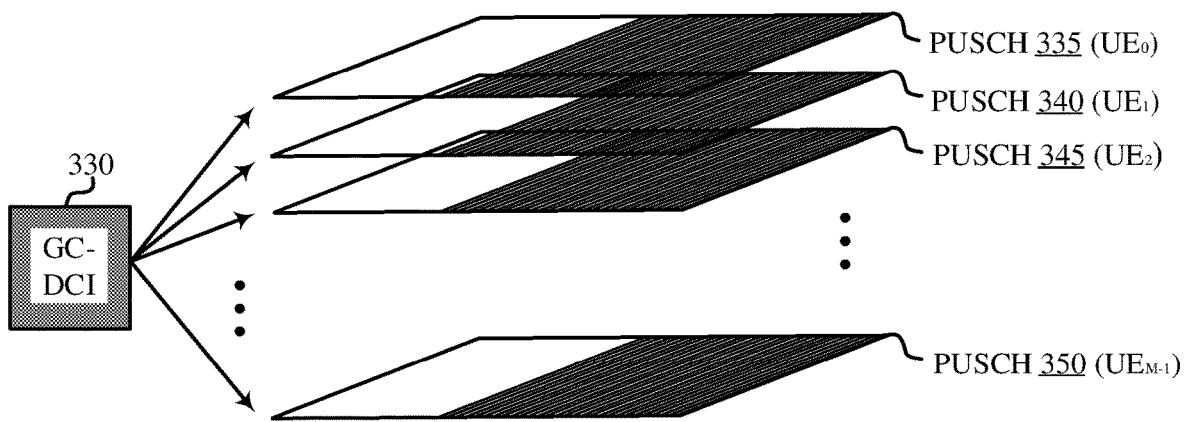

FIGS. 3A and 3B illustrate examples of multiplexing schemes 300 that support group scheduling requests and resource assignments in accordance with aspects of the present disclosure. In some examples, multiplexing schemes 300 may implement aspects of wireless communication system 100. For example, multiplexing schemes 300 may be configured and/or implemented by wireless devices such as base stations and UEs located within the wireless communication system 100.

In addition to different SRs transmitted by UEs in the network, different types of UE scheduling such as single UE scheduling and group UE scheduling may be differentiated by the PUCCH resources assigned at the base station. For instance, in the case of UE-group scheduling, the allocated resource set (e.g., PUCCH resources) and corresponding SR IDs may be included in a downlink control message or an RRC transmitted from the base station. In some cases, the base station may configure DCI to be common to a group of UEs, and may include group common information such as scheduling information or multiplexing information.

A number of different multiplexing schemes may be applied to the UEs within a given UE group as indicated by DCI transmitted from the base station. A specific group of UEs can be scheduled with a group common DCI (GC-DCI) (e.g., GC-DCIs 305 or 330) where the GC-DCI includes a number of CRC bits scrambled by a radio network temporary identifier (RNTI) (e.g., a group scheduling RNTI) which may be common for all the UEs in the group. The GC-DCI may include a common field of indication for time/frequency resource assignment which are common to all the UEs in the group. The resources indicated by the resource assignment may be multiplexed with a predefined or preconfigured rule.

In the example of FIG. 3A, a base station may send GC-DCI 305 to a number of UEs in a group (e.g., including $UE_0$, $UE_1$, $UE_2$, through $UE_{N-1}$). The GC-DCI 305 may include an indication of resources that the UEs may use to transmit uplink data. For example, the GC-DCI 305 may indicate a number of physical uplink shared channel (PUSCH) resources (e.g., PUSCH 310, 315, 320 through 325) which may be used by $UE_0$, $UE_1$, $UE_2$, through $UE_{N-1}$ to transmit uplink data. In addition, GC-DCI may include a multiplexing scheme that may be used to multiplex the transmissions included in the group transmission associated with the UE group. In one example, a multiplexing scheme may include multi-slot scheduling (e.g., time division multiplexing) across slots (n), (n+1), (n+2), through (n+M−1). In the example of FIG. 3A, each uplink channel (e.g., PUSCH) resource may be assigned to each slot sequentially, and each UE (e.g., $UE_0$ through $UE_{M-1}$) may be assigned resources in a corresponding slot (e.g., slot n through slot n+M−1). In some cases, a slot to which the UE corresponds may be determined by the UEs index in the group (e.g., $m \in \{0,1,\ldots,M-1\}$, where M corresponds to the number of UEs in the group).

The example of FIG. 3B shows another multiplexing scheme, where GC-DCI configures uplink channel (e.g., PUSCH) resources for different UEs in a group of UEs (e.g., $UE_0$ through $UE_{M-1}$). In such multiplexing schemes, the uplink transmissions may be multiplexed using multiple-user multiple-input multiple-output (MU-MIMO) with orthogonal demodulation reference signal (DMRS). For example, the group of UEs may be scheduled using a multiple layer MIMO transmission corresponding to PUSCH resources 335, 340, 345, through 350, and where each UE corresponds to a different DMRS port. In some cases, the DMRS may be code division multiplexed (CDM), using a cyclic shift of a base sequence or orthogonal cover codes. In addition, each DMRS port may be associated with a corresponding UE index m.

In either case, a UE which is scheduled by the GC-DCI (e.g., 305, 330) may send report signaling such as a buffer status report (BSR) via a shared channel (e.g., PUSCH) using the time/frequency resource assignment and multiplexing scheme indicated in the GC-DCI. In such cases, the UE may notify the network of the amount of buffered data that it may send using the allocated resources.

Figure 4:
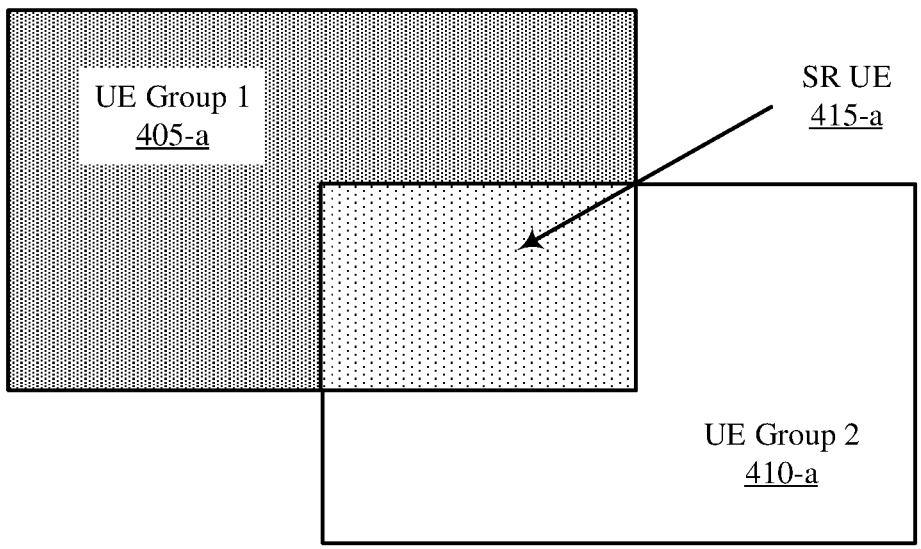
FIG. 4 illustrates an example of UE group configurations that support group scheduling requests and resource assignments in accordance with aspects of the present disclosure.
Figure 4:
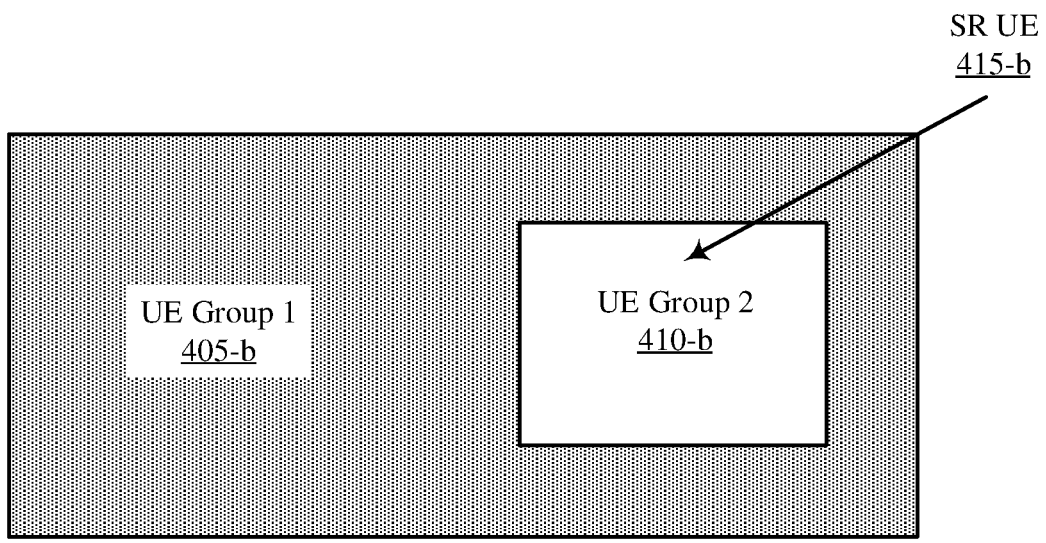

FIG. 4 illustrates an example of UE group configurations 400 that support group scheduling requests and resource assignments in accordance with aspects of the present disclosure. In some examples, UE group configurations 400 may implement aspects of wireless communication system 100. UE group configurations 400 may include a number of UEs, which may be examples of UEs 115 described with reference to FIG. 1.

According to the methods described herein, multiple different SRs for UE scheduling may be configured across different or overlapping UE groups. For example, two or more different UE groups 405 and 410 may be present in a network (e.g., UE group 1 and UE group 2). In some cases, the two or more UE groups may intersect. For example, UE group 405-a may intersect or overlap with UE group 410-a. In such cases, a UE 415-a located in the intersection of UE group 405-a and 410-a may send an SR indicating a request for group scheduling for UE group 405-a, 410-a or both to a base station. The UE may indicate a request for resources to configure UEs in group 405-a, 405-b, or both.

In some other cases, a UE group 410-b may belong to another UE group 405-b (e.g., UE group 2 is designated as part of UE group 1). For example, UE group 410-b may be a subgroup of UE group 405-b. In such cases, a UE 415-b located in UE group 410-b may send the SR to the base station indicating a request for group scheduling for UE group 405-b or 410-b. The UE may indicate a request for group common resources to configure UEs in group 405-a, 405-b, or both.

In yet other cases, one or more UE groups may not overlap or intersect, and a UE from either group may send an SR. In some cases, only one UE from the group would transmit the SR (e.g., to reduce traffic), and in some other cases, each UE or a number of UEs from the group would transmit the scheduling request to the base station (and whichever SR is received by the base station first, or whichever SR has a strongest signal at the base station would be used).

Figure 5:
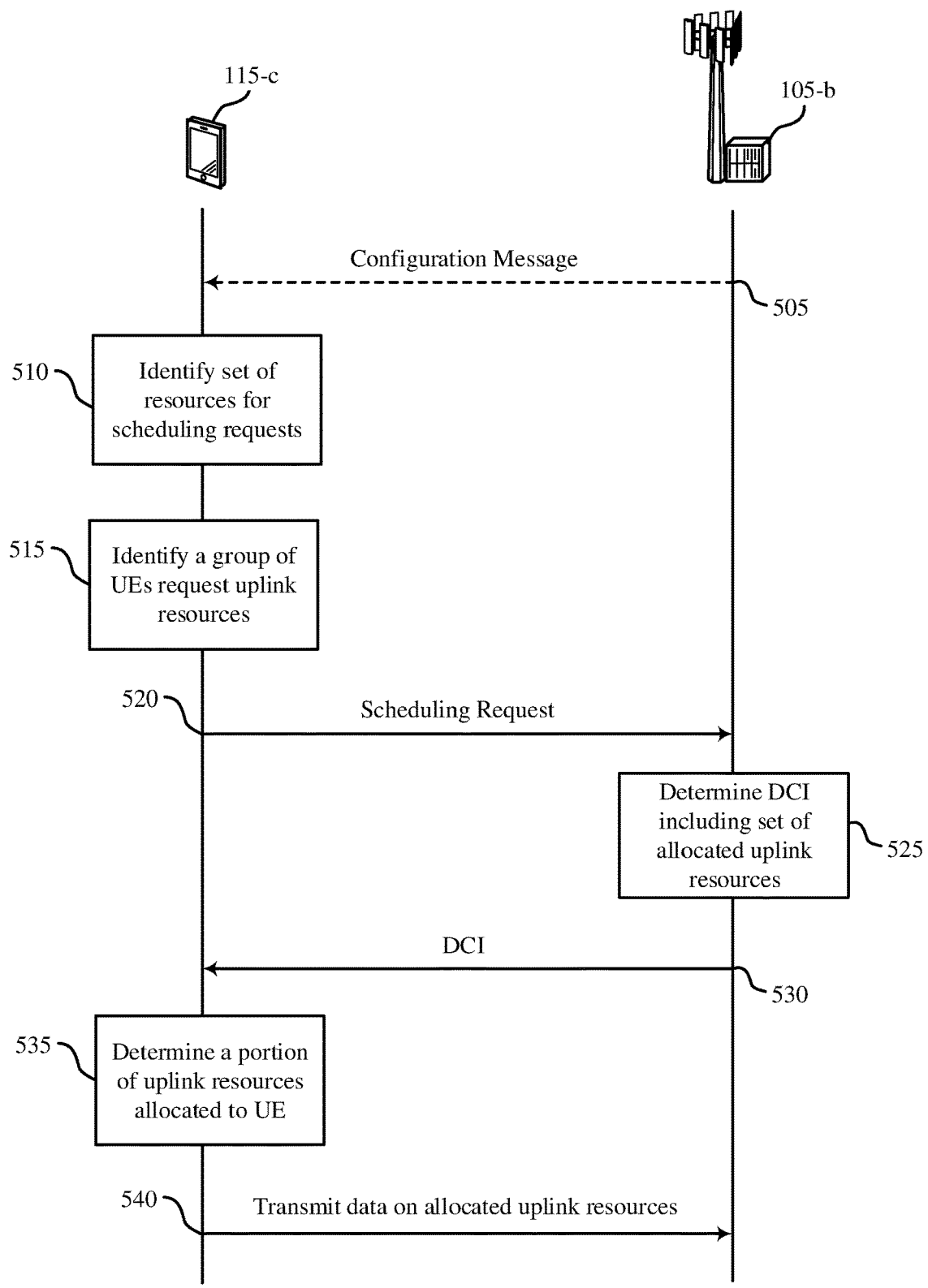
FIG. 5 illustrates an example of a process flow diagram that supports group scheduling requests and resource assignments in accordance with aspects of the present disclosure.

FIG. 5 illustrates an example of a process flow diagram 500 that supports group scheduling requests and resource assignments in accordance with aspects of the present disclosure. In some examples, process flow diagram 500 may implement aspects of wireless communication system 100. For example, process flow diagram 500 may include communications between a UE 115-c and a base station 105-b, which may be examples of a UE 115 and a base station 105 described with reference to FIG. 1. Additionally, UE 115-c may be an example of a video monitoring UE 115 described with reference to FIG. 2.

At 505, the base station 105-b may identify a set of dedicated uplink resources for transmitting scheduling requests associated with group scheduling and may transmit and indication of the set of dedicated uplink resources to a UE 115. In some cases, the base station 105-b may transmit a configuration message to the UE 115-c. In some examples, the configuration message may include an RRC message, broadcast system information, a MAC-control element, or a combination thereof. The configuration message may configure the set of dedicated uplink time, frequency, and/or spatial resources for scheduling requests associated with group scheduling.

At 510, the UE 115-c may identify a set of dedicated uplink resources for scheduling requests associated with group scheduling. In some cases, the UE 115-c may identify the set of dedicated uplink resources by receiving DCI (e.g., an RRC) from a base station which may configure the dedicated uplink resources.

At 515, the UE 115-c may determine that a group of UEs request uplink resources for and uplink data transmission. In some cases, the group of UEs may include UE 115-c. In some cases, the group of UEs may request group scheduling, or may request resources for a simultaneous transmission to the base station 105-b.

At 520, the UE 115-c may transmit a scheduling request to the base station 105-b. In some cases, the scheduling request may include an indication that a group of UEs request uplink resources for data transmission. In some examples, the scheduling request transmitted by UE 115-c may include a group scheduling indication. The group scheduling indication may include a set of one or more scheduling mode indicator bits associated with group scheduling of the UE 115-c. The UE 115-c may generate the group scheduling indication in various ways, such as by applying a cyclic shift associated with group scheduling to a base sequence, and/or by multiplying the base sequence by a complex value multiplier associated with group scheduling. In some cases, the group scheduling indication includes an identifier of the group of UEs (e.g., the group of UEs that request resources).

At 525, the base station 105-b may receive the scheduling request from UE 115-c on at least one scheduling request resource of the identified dedicated uplink resources allocated to UE 115-c, and may transmit DCI to the UE 115-c based on the scheduling request. The DCI may allocate uplink resources to the UE based on the scheduling request. In some cases, the DCI may indicate an uplink resource assignment for all UEs of the group, for example, the DCI may be a GC-DCI which is addressed to a group of UEs. In some examples, the set of uplink resources indicated in the DCI may be allocated to the UE based on the uplink resource assignment and an index of the UE.

At 530, the base station 105-b may transmit the DCI to the UE 115-c, and the UE 115-c may receive the DCI. In some cases, the base station may scramble a set of CRC bits based on a group common RNTI, and the UE 115-c may unscramble the set of CRC bits based on the group common RNTI.

At 535, the UE 115-c may determine a portion of allocated uplink resources based on the scheduling request, and as indicated in the received DCI. The DCI may further contain an indication of a multiplexing scheme for the uplink resources such as a multi-slot scheduling scheme wherein each UE of the group of UEs is allocated uplink resources from a different slot of the uplink resource assignment for all UEs of the group. The multiplexing scheme may also be a MU-MIMO spatial multiplexing scheme, wherein each UE of the group of UEs is associated with a separate orthogonal code domain multiplexed demodulation reference signal. According to some aspects, the multiplexing schemes indicated in DCI may be the same or similar to the multiplexing schemes described with reference to FIGS. 3A and 3B. In some other cases, the multiplexing scheme may be preconfigured or standardized, and may not be included in a DCI indication.

At 540, the UE 115-c may transmit uplink data on the allocated uplink resources. In some cases, the UE 115-c may transmit uplink resources as part of a group transmission with a number of other UEs in a UE group. In some cases, the UE 115-c may transmit a BSR on the portion of allocated uplink resources.

Figure 6:
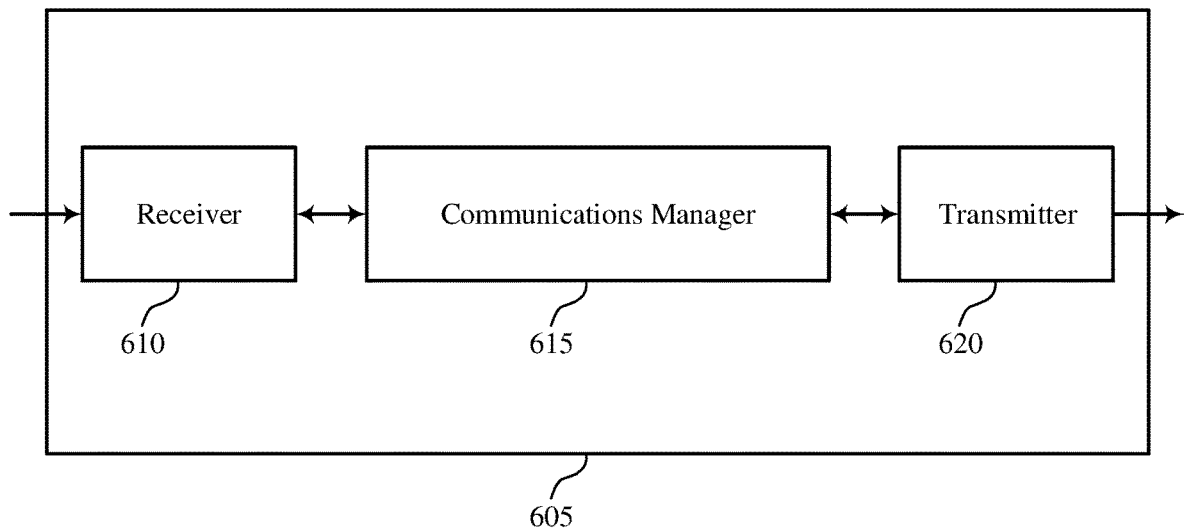
FIGS. 6 and 7 show block diagrams of devices that support group scheduling requests and resource assignments in accordance with aspects of the present disclosure.

FIG. 6 shows a block diagram 600 of a device 605 that supports group scheduling requests and resource assignments in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, or information related to group scheduling requests and resource assignments). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit a scheduling request to a base station, the scheduling request including an indication that a group of UEs request uplink resources for data transmission, receive, based on the scheduling request, downlink control information from the base station, the downlink control information including an indication of uplink resources allocated to the UE based on the scheduling request, and transmit uplink data to the base station using the uplink resources allocated to the UE. The communications manager 615 may be an example of aspects of the communications manager 910 described herein.

The communications manager 615, or its sub-components, may be implemented in hardware, software (e.g., executed by a processor), or any combination thereof. If implemented in code executed by a processor, the functions of the communications manager 615, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, or antennas) coupled with the mobile device modem to enable wireless transmission and reception.

The communications manager 615 as described herein may be implemented to realize one or more potential advantages. Various implementations may enable the reduction of uplink and downlink overhead by reducing the number of scheduling requests transmitted by UEs and processed by base stations within the wireless network. This reduction in scheduling requests allows for reduced uplink collisions and a more efficient use of wireless resources, thereby improving performance and data throughput. At least one implementation may enable the communications manager 615 to effectively coordinate communications and identify SR resources that may be used in scheduling a group transmission, for example, when a number of UEs have data to transmit simultaneously.

Based on implementing the interference mitigation techniques as described herein, one or more processors of the device 605 (e.g., processor(s) controlling or incorporated with one or more of receiver 610, communications manager 615, and transmitter 620) may reduce communications latency within the wireless network by reducing the number of SRs transmitted, and correspondingly reducing the number of transmission collisions. In addition, communications reliability and speed may be increased in devices operating as part of a security system, where improved techniques for scheduling simultaneous transmissions may reduce the amount of time between detecting a trigger event and initiating an alarm or similar response process.

Figure 7:
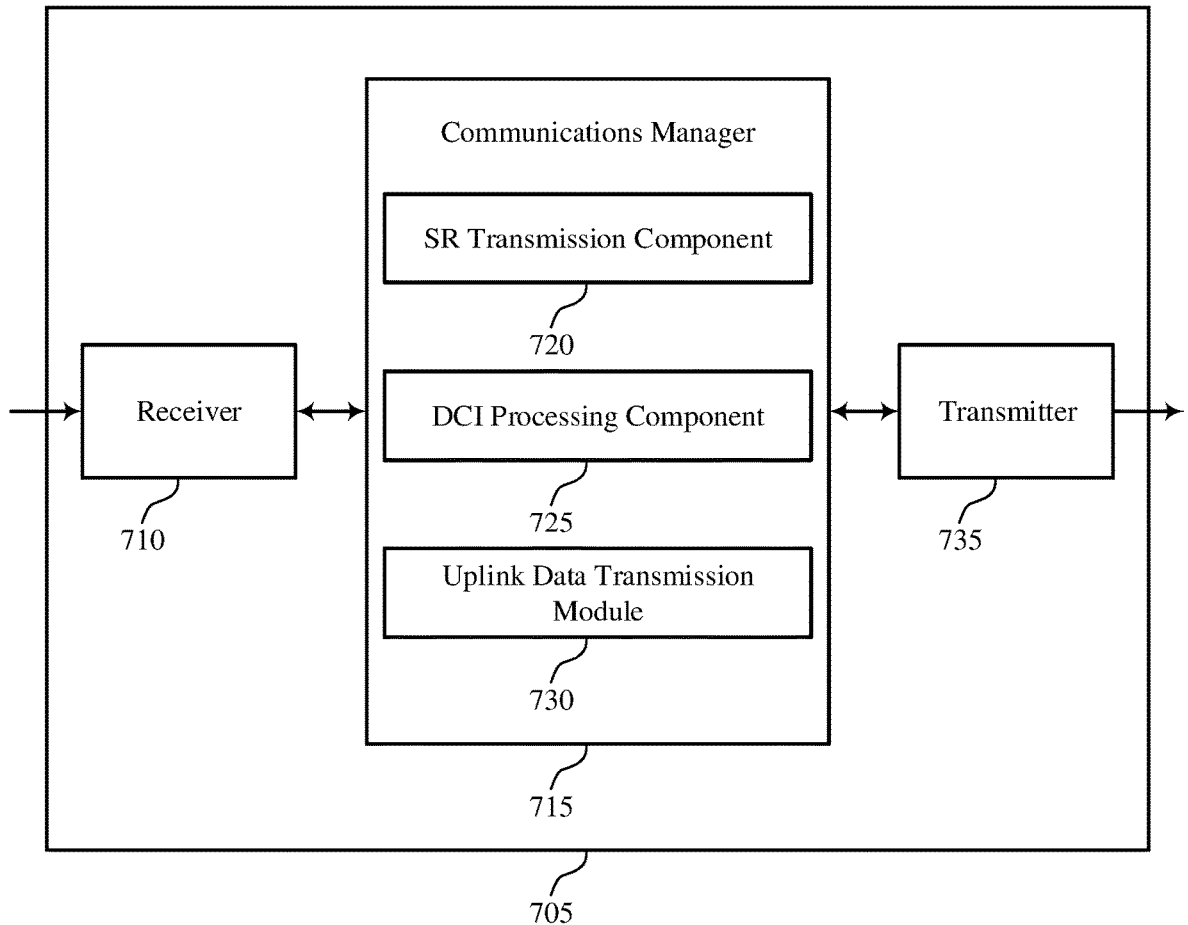

FIG. 7 shows a block diagram 700 of a device 705 that supports group scheduling requests and resource assignments in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, or information related to group scheduling requests and resource assignments). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a SR transmission component 720, a DCI processing component 725, and an uplink data transmission module 730. The communications manager 715 may be an example of aspects of the communications manager 910 described herein.

The SR transmission component 720 may transmit a scheduling request to a base station, the scheduling request including an indication that a group of UEs request uplink resources for data transmission.

The DCI processing component 725 may receive, based on the scheduling request, downlink control information from the base station, the downlink control information including an indication of uplink resources allocated to the UE based on the scheduling request.

The uplink data transmission module 730 may transmit uplink data to the base station using the uplink resources allocated to the UE.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
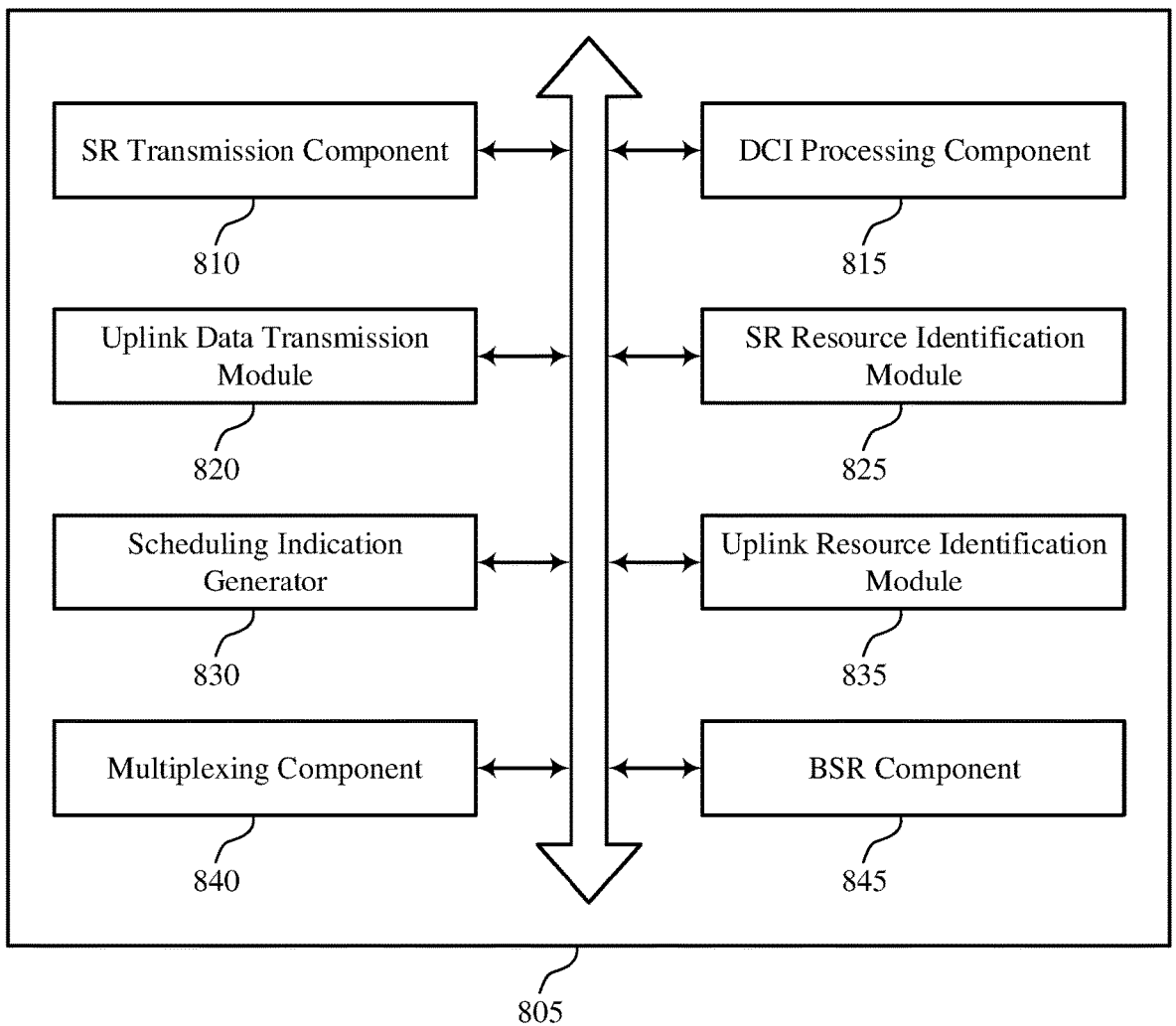
FIG. 8 shows a block diagram of a device that supports group scheduling requests and resource assignments in accordance with aspects of the present disclosure.

FIG. 8 shows a block diagram 800 of a communications manager 805 that supports group scheduling requests and resource assignments in accordance with aspects of the present disclosure. The communications manager 805 may be an example of aspects of a communications manager 615, a communications manager 715, or a communications manager 910 described herein. The communications manager 805 may include a SR transmission component 810, a DCI processing component 815, an uplink data transmission module 820, a SR resource identification module 825, a scheduling indication generator 830, an uplink resource identification module 835, a multiplexing component 840, and a BSR component 845. Each of these modules may communicate, directly or indirectly, with one another (e.g., via one or more buses).

The SR transmission component 810 may transmit a scheduling request to a base station, the scheduling request including an indication that a group of UEs request uplink resources for data transmission. In some examples, the SR transmission component 810 may include a group scheduling indication in the scheduling request. In some cases, the group scheduling indication includes a set of one or more scheduling mode indicator bits associated with group scheduling.

The DCI processing component 815 may receive, based on the scheduling request, downlink control information from the base station, the downlink control information including an indication of uplink resources allocated to the UE based on the scheduling request. In some examples, the DCI processing component 815 may unscramble a set of cyclic redundancy check bits based on an identifier of the group of UEs. In some cases, the downlink control information includes group common downlink control information indicating an uplink resource assignment for all UEs of the group. In some cases, the identifier of the group of UEs includes a group common radio network temporary identifier (GC-RNTI).

The uplink data transmission module 820 may transmit uplink data to the base station using the uplink resources allocated to the UE.

The SR resource identification module 825 may identify a set of dedicated uplink resources for scheduling requests associated with group scheduling, where the scheduling request is transmitted to the base station using at least one scheduling request resource of the identified set of dedicated scheduling request resources. In some examples, the SR resource identification module 825 may receive an RRC message configuring the set of dedicated uplink resources for scheduling requests associated with group scheduling.

The scheduling indication generator 830 may generate the group scheduling indication by applying a cyclic shift associated with group scheduling to a base sequence; where the scheduling request is transmitted based on the base sequence and the cyclic shift.

In some examples, the scheduling indication generator 830 may generate the group scheduling indication by multiplying a base sequence by a complex-value multiplier associated with group scheduling; where the scheduling request is transmitted based on the base sequence and the complex-value multiplier. In some cases, the group scheduling indication includes an identifier of the group of UEs.

The uplink resource identification module 835 may determine the uplink resources allocated to the UE based on the uplink resource assignment for all UEs of the group and an index of the UE.

The multiplexing component 840 may execute a multiplexing scheme which may include a multi-slot scheduling scheme where each UE of the group of UEs is allocated uplink resources from a different slot of the uplink resource assignment for all UEs of the group. In some cases, the multiplexing scheme includes a multiple user multiple input multiple output spatial multiplexing scheme, where each UE of the group of UEs is associated with a separate orthogonal code domain multiplexed demodulation reference signal.

The BSR component 845 may transmit a buffer status report using the portion of the uplink resources allocated to the UE.

Figure 9:
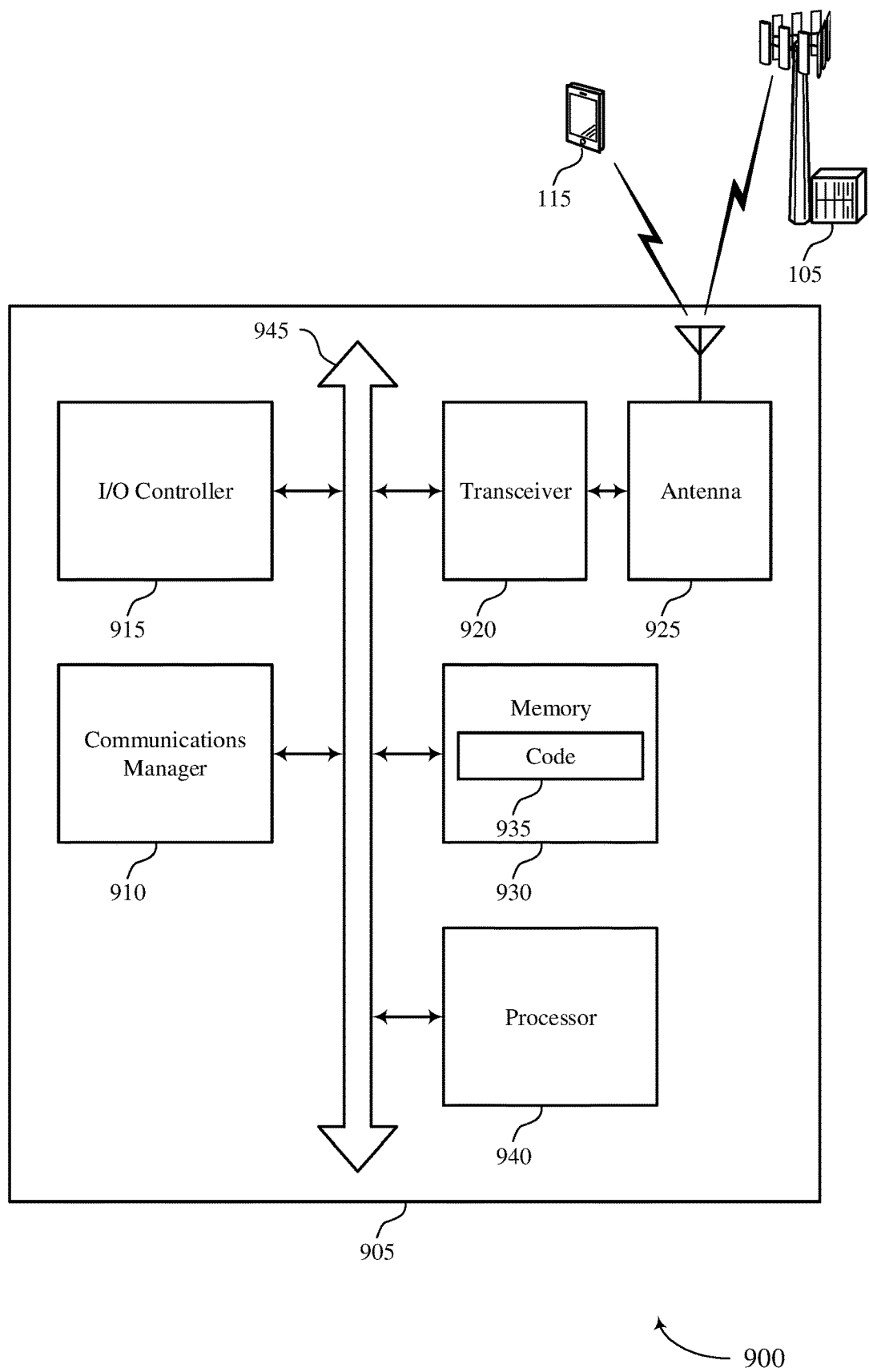
FIG. 9 shows a diagram of a system including a device that supports group scheduling requests and resource assignments in accordance with aspects of the present disclosure.

FIG. 9 shows a diagram of a system 900 including a device 905 that supports group scheduling requests and resource assignments in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit a scheduling request to a base station, the scheduling request including an indication that a group of UEs request uplink resources for data transmission, receive, based on the scheduling request, downlink control information from the base station, the downlink control information including an indication of uplink resources allocated to the UE based on the scheduling request, and transmit uplink data to the base station using the uplink resources allocated to the UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting group scheduling requests and resource assignments).

Figure 10:
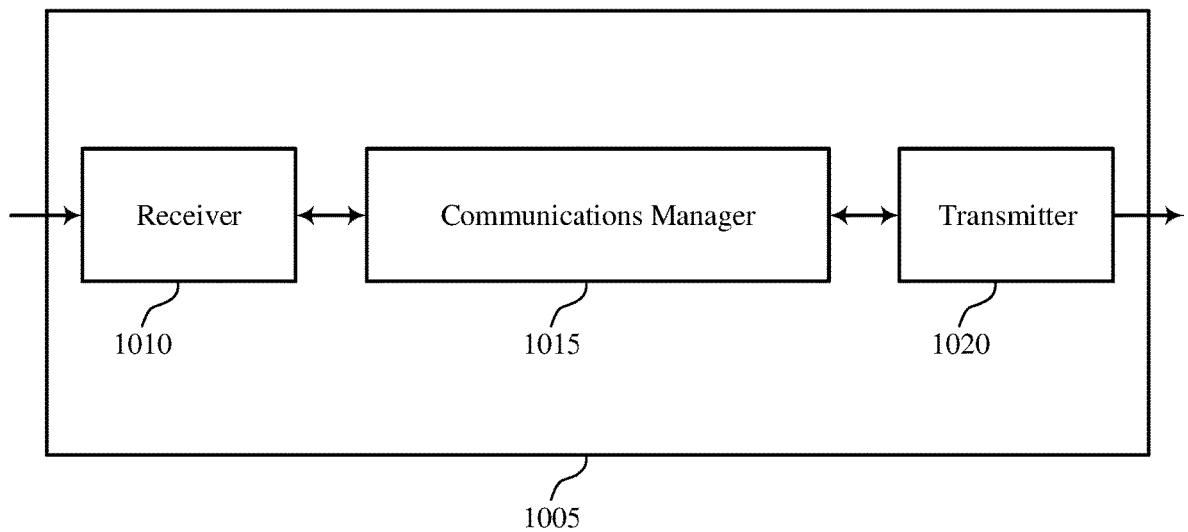
FIGS. 10 and 11 show block diagrams of devices that support group scheduling requests and resource assignments in accordance with aspects of the present disclosure.

FIG. 10 shows a block diagram 1000 of a device 1005 that supports group scheduling requests and resource assignments in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, or information related to group scheduling requests and resource assignments). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a scheduling request from a UE, the scheduling request including an indication that a group of UEs request uplink resources for data transmission, determine, based on the scheduling request, downlink control information for the UE, the downlink control information including an indication of uplink resources allocated to the UE based on the scheduling request, transmit the downlink control information to the UE, and receive uplink data from the UE on the uplink resources allocated to the UE. The communications manager 1015 may be an example of aspects of the communications manager 1310 described herein.

The communications manager 1015, or its sub-components, may be implemented in hardware, software (e.g., executed by a processor), or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
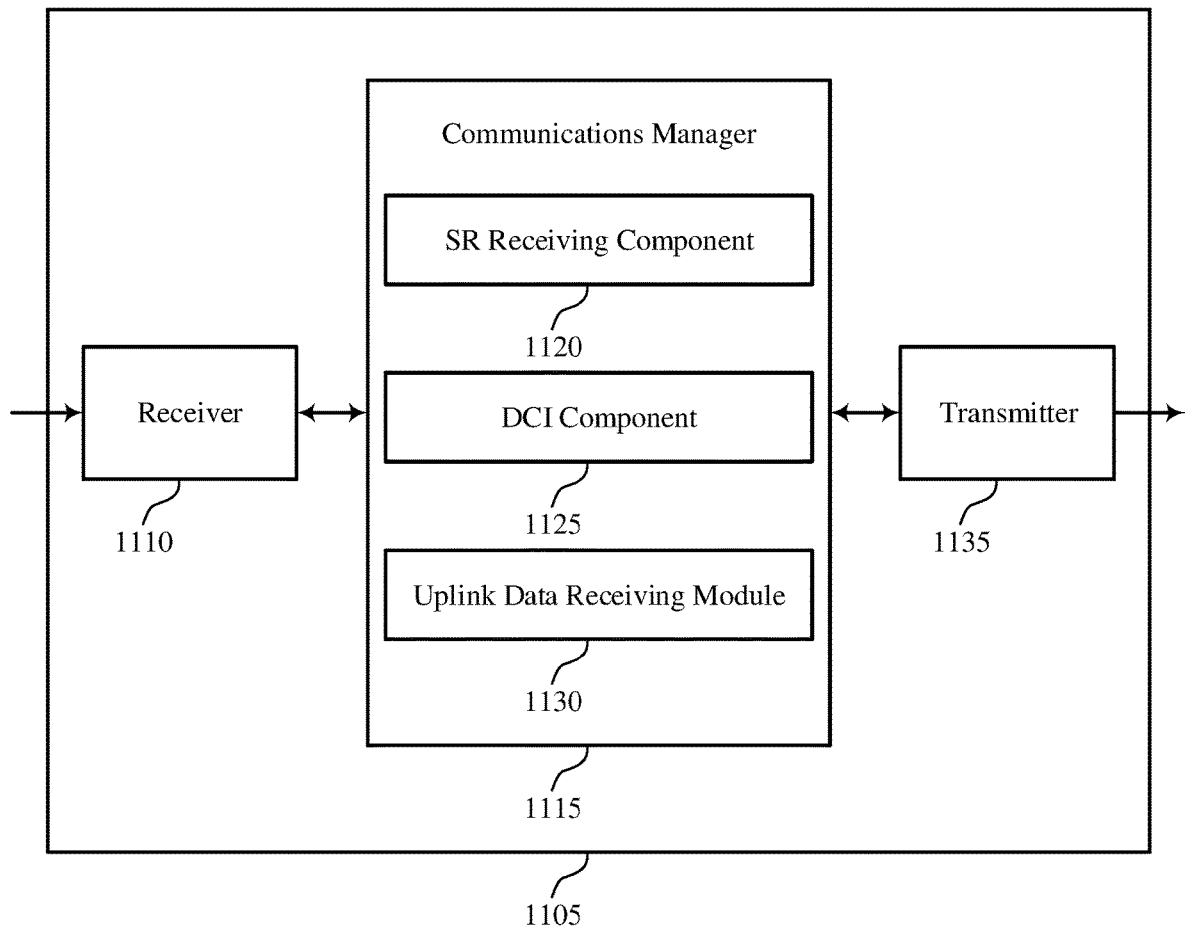

FIG. 11 shows a block diagram 1100 of a device 1105 that supports group scheduling requests and resource assignments in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, or information related to group scheduling requests and resource assignments). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a SR receiving component 1120, a DCI component 1125, and an uplink data receiving module 1130. The communications manager 1115 may be an example of aspects of the communications manager 1310 described herein.

The SR receiving component 1120 may receive a scheduling request from a UE, the scheduling request including an indication that a group of UEs request uplink resources for data transmission.

The DCI component 1125 may determine, based on the scheduling request, downlink control information for the UE, the downlink control information including an indication of uplink resources allocated to the UE based on the scheduling request and transmit the downlink control information to the UE.

The uplink data receiving module 1130 may receive uplink data from the UE on the uplink resources allocated to the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
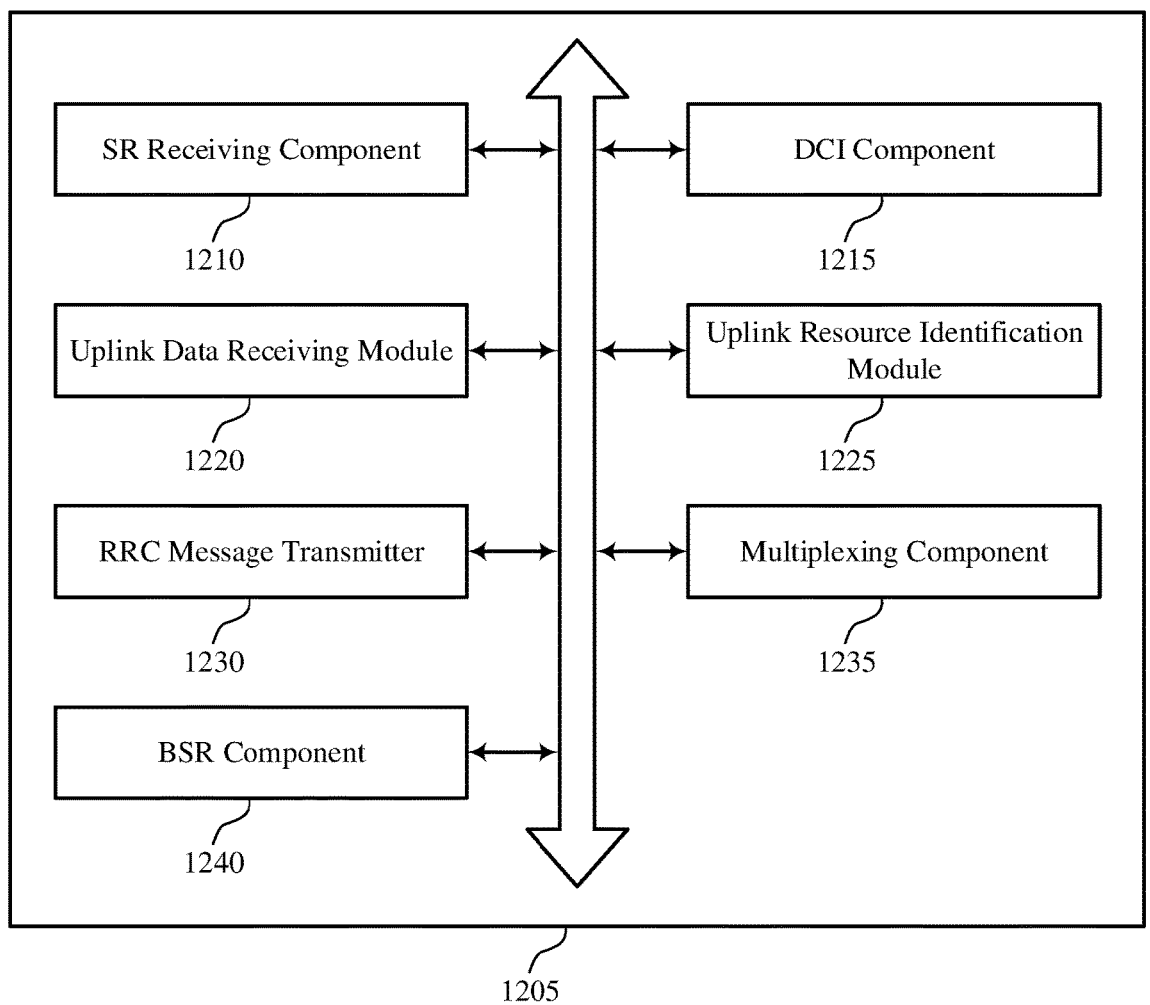
FIG. 12 shows a block diagram of a device that supports group scheduling requests and resource assignments in accordance with aspects of the present disclosure.

FIG. 12 shows a block diagram 1200 of a communications manager 1205 that supports group scheduling requests and resource assignments in accordance with aspects of the present disclosure. The communications manager 1205 may be an example of aspects of a communications manager 1015, a communications manager 1115, or a communications manager 1310 described herein. The communications manager 1205 may include a SR receiving component 1210, a DCI component 1215, an uplink data receiving module 1220, an uplink resource identification module 1225, an RRC message transmitter 1230, a multiplexing component 1235, and a BSR component 1240. Each of these modules may communicate, directly or indirectly, with one another (e.g., via one or more buses).

The SR receiving component 1210 may receive a scheduling request from a UE, the scheduling request including an indication that a group of UEs request uplink resources for data transmission. In some examples, the SR receiving component 1210 may receive the scheduling request from the UE on at least one scheduling request resource of the identified set of dedicated scheduling request resources. In some examples, the SR receiving component 1210 may receive a group scheduling indication in the scheduling request.

In some examples, the SR receiving component 1210 may receive the scheduling request based on a base sequence and a cyclic shift associated with group scheduling applied to scheduling request at the UE. In some examples, the SR receiving component 1210 may receive the scheduling request based on a base sequence and complex-value multiplier associated with group scheduling used to generate the group scheduling information at the UE.

In some cases, the group scheduling indication includes a set of one or more scheduling mode indicator bits associated with group scheduling. In some cases, the group scheduling indication includes an identifier of the group of UEs.

The DCI component 1215 may determine, based on the scheduling request, downlink control information for the UE, the downlink control information including an indication of uplink resources allocated to the UE based on the scheduling request. In some examples, the DCI component 1215 may transmit the downlink control information to the UE. In some examples, the DCI component 1215 may scramble a set of cyclic redundancy check bits based on an identifier of the group of UEs.

In some cases, the downlink control information includes group common downlink control information indicating an uplink resource assignment for all UEs of the group. In some cases, the identifier of the group of UEs includes a group common radio network temporary identifier (GC-RNTI).

The uplink data receiving module 1220 may receive uplink data from the UE on the uplink resources allocated to the UE.

The uplink resource identification module 1225 may identify a set of dedicated uplink resources for scheduling requests associated with group scheduling. In some examples, the uplink resource identification module 1225 may transmit, to the UE, an indication of the set of dedicated uplink resources for scheduling requests associated with group scheduling. In some cases, the uplink resources allocated to the UE is indicated based on the uplink resource assignment for all UEs of the group and an index of the UE.

The RRC message transmitter 1230 may transmit an RRC message configuring the set of dedicated uplink resources for scheduling requests associated with group scheduling.

The multiplexing component 1235 may execute a multiplexing scheme which may include a multi-slot scheduling scheme where each UE of the group of UEs is allocated uplink resources from a different slot of the uplink resource assignment for all UEs of the group. In some cases, the multiplexing scheme includes a multiple user multiple input multiple output spatial multiplexing scheme, where each UE of the group of UEs is associated with a separate orthogonal code domain multiplexed demodulation reference signal.

The BSR component 1240 may receive a buffer status report on the portion of the uplink resources allocated to the UE.

Figure 13:
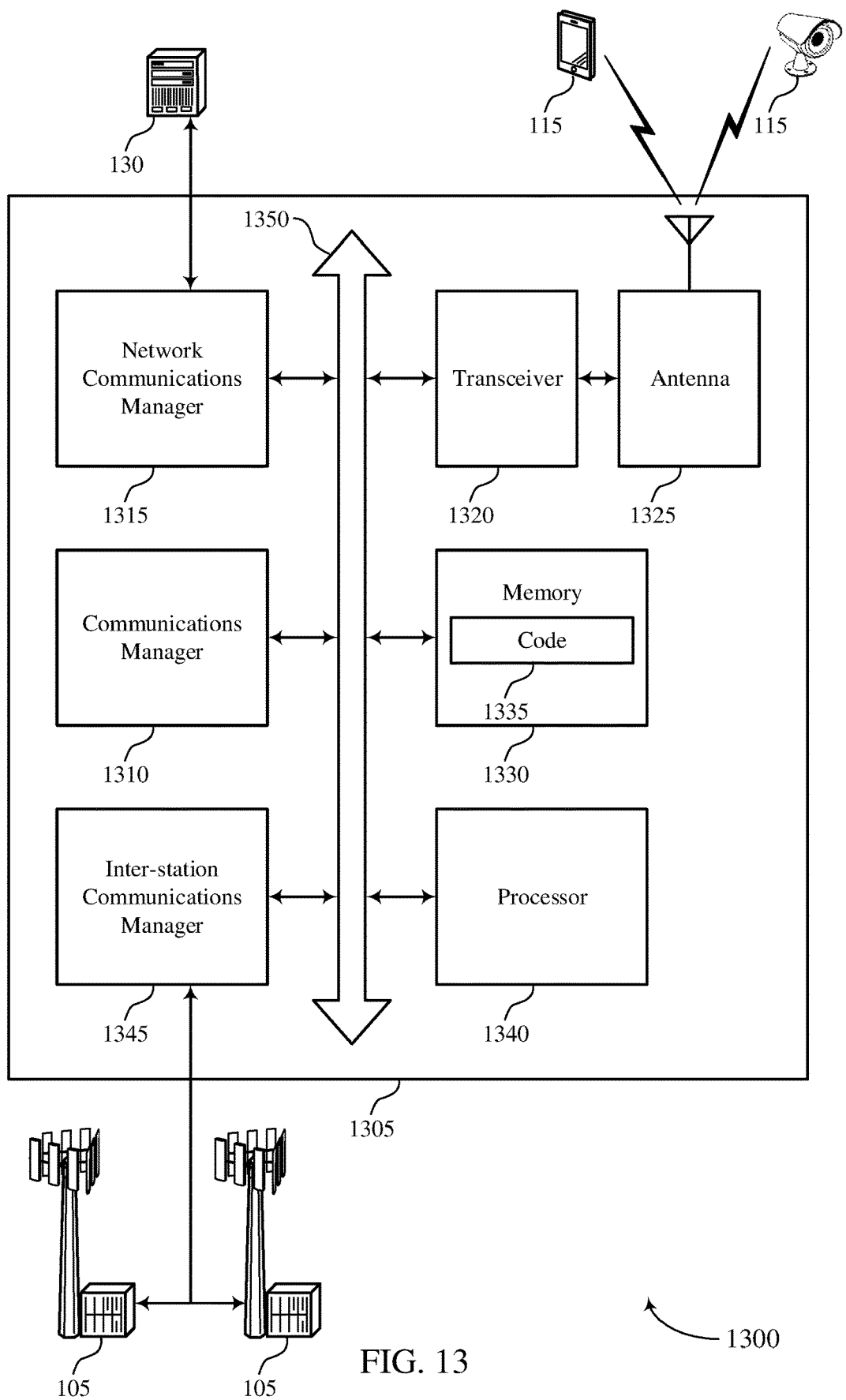
FIG. 13 shows a diagram of a system including a device that supports group scheduling requests and resource assignments in accordance with aspects of the present disclosure.

FIG. 13 shows a diagram of a system 1300 including a device 1305 that supports group scheduling requests and resource assignments in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive a scheduling request from a UE, the scheduling request including an indication that a group of UEs request uplink resources for data transmission, determine, based on the scheduling request, downlink control information for the UE, the downlink control information including an indication of uplink resources allocated to the UE based on the scheduling request, transmit the downlink control information to the UE, and receive uplink data from the UE on the uplink resources allocated to the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting group scheduling requests and resource assignments).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
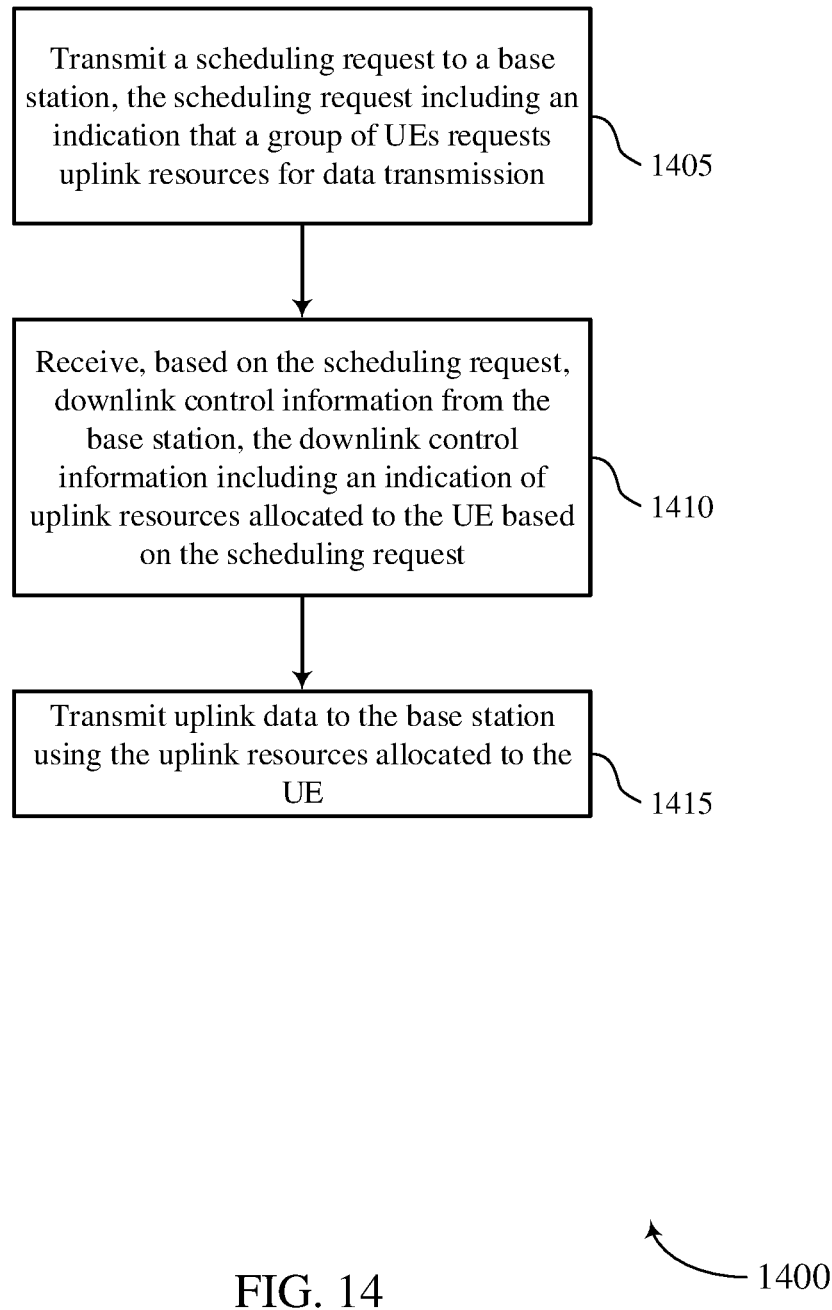
FIGS. 14 through 18 show flowcharts illustrating methods that support group scheduling requests and resource assignments in accordance with aspects of the present disclosure.

FIG. 14 shows a flowchart illustrating a method 1400 that supports group scheduling requests and resource assignments in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may transmit a scheduling request to a base station, the scheduling request including an indication that a group of UEs request uplink resources for data transmission. The operations of 1405 may be performed according to the methods described herein. In some examples, aspects of the operations of 1405 may be performed by a SR transmission component as described with reference to FIGS. 6 through 9.

At 1410, the UE may receive, based on the scheduling request, downlink control information from the base station, the downlink control information including an indication of uplink resources allocated to the UE based on the scheduling request. The operations of 1410 may be performed according to the methods described herein. In some examples, aspects of the operations of 1410 may be performed by a DCI processing component as described with reference to FIGS. 6 through 9.

At 1415, the UE may transmit uplink data to the base station using the uplink resources allocated to the UE. The operations of 1415 may be performed according to the methods described herein. In some examples, aspects of the operations of 1415 may be performed by an uplink data transmission module as described with reference to FIGS. 6 through 9.

Figure 15:
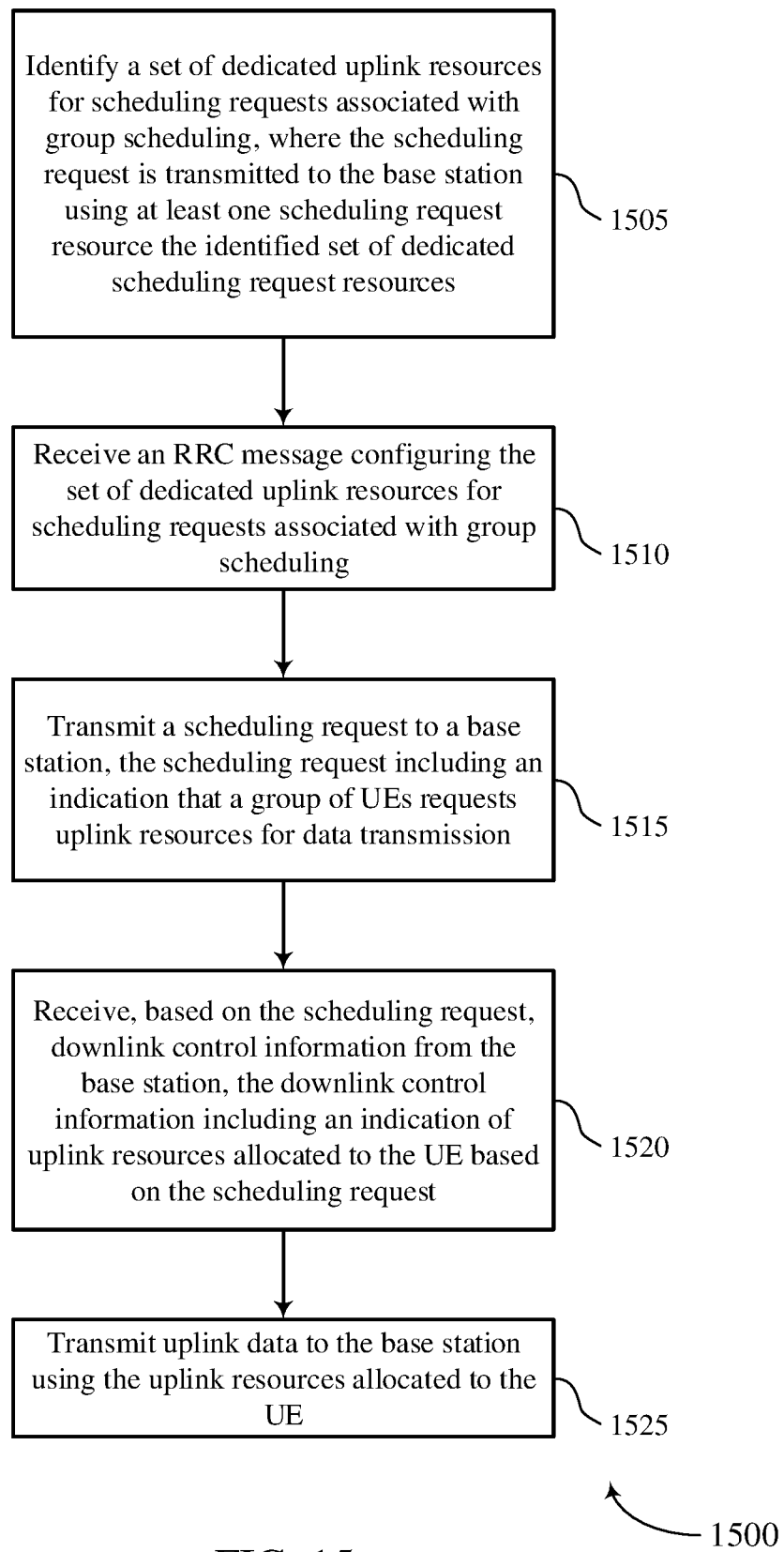

FIG. 15 shows a flowchart illustrating a method 1500 that supports group scheduling requests and resource assignments in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may identify a set of dedicated uplink resources for scheduling requests associated with group scheduling, where the scheduling request is transmitted to the base station using at least one scheduling request resource of the identified set of dedicated scheduling request resources. The operations of 1505 may be performed according to the methods described herein. In some examples, aspects of the operations of 1505 may be performed by a SR resource identification module as described with reference to FIGS. 6 through 9.

At 1510, the UE may receive an RRC message configuring the set of dedicated uplink resources for scheduling requests associated with group scheduling. The operations of 1510 may be performed according to the methods described herein. In some examples, aspects of the operations of 1510 may be performed by a SR resource identification module as described with reference to FIGS. 6 through 9.

At 1515, the UE may transmit a scheduling request to a base station, the scheduling request including an indication that a group of UEs request uplink resources for data transmission. The operations of 1515 may be performed according to the methods described herein. In some examples, aspects of the operations of 1515 may be performed by a SR transmission component as described with reference to FIGS. 6 through 9.

At 1520, the UE may receive, based on the scheduling request, downlink control information from the base station, the downlink control information including an indication of uplink resources allocated to the UE based on the scheduling request. The operations of 1520 may be performed according to the methods described herein. In some examples, aspects of the operations of 1520 may be performed by a DCI processing component as described with reference to FIGS. 6 through 9.

At 1525, the UE may transmit uplink data to the base station using the uplink resources allocated to the UE. The operations of 1525 may be performed according to the methods described herein. In some examples, aspects of the operations of 1525 may be performed by an uplink data transmission module as described with reference to FIGS. 6 through 9.

Figure 16:
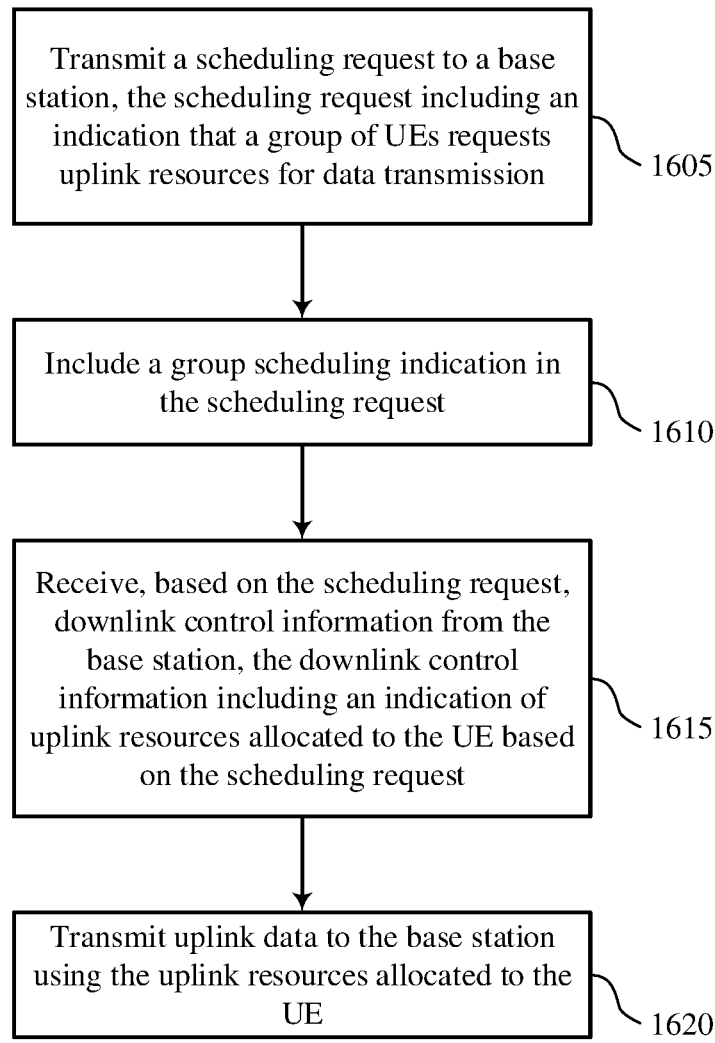

FIG. 16 shows a flowchart illustrating a method 1600 that supports group scheduling requests and resource assignments in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the UE may transmit a scheduling request to a base station, the scheduling request including an indication that a group of UEs request uplink resources for data transmission. The operations of 1605 may be performed according to the methods described herein. In some examples, aspects of the operations of 1605 may be performed by a SR transmission component as described with reference to FIGS. 6 through 9.

At 1610, the UE may include a group scheduling indication in the scheduling request. The operations of 1610 may be performed according to the methods described herein. In some examples, aspects of the operations of 1610 may be performed by a SR transmission component as described with reference to FIGS. 6 through 9.

At 1615, the UE may receive, based on the scheduling request, downlink control information from the base station, the downlink control information including an indication of uplink resources allocated to the UE based on the scheduling request. The operations of 1615 may be performed according to the methods described herein. In some examples, aspects of the operations of 1615 may be performed by a DCI processing component as described with reference to FIGS. 6 through 9.

At 1620, the UE may transmit uplink data to the base station using the uplink resources allocated to the UE. The operations of 1620 may be performed according to the methods described herein. In some examples, aspects of the operations of 1620 may be performed by an uplink data transmission module as described with reference to FIGS. 6 through 9.

Figure 17:
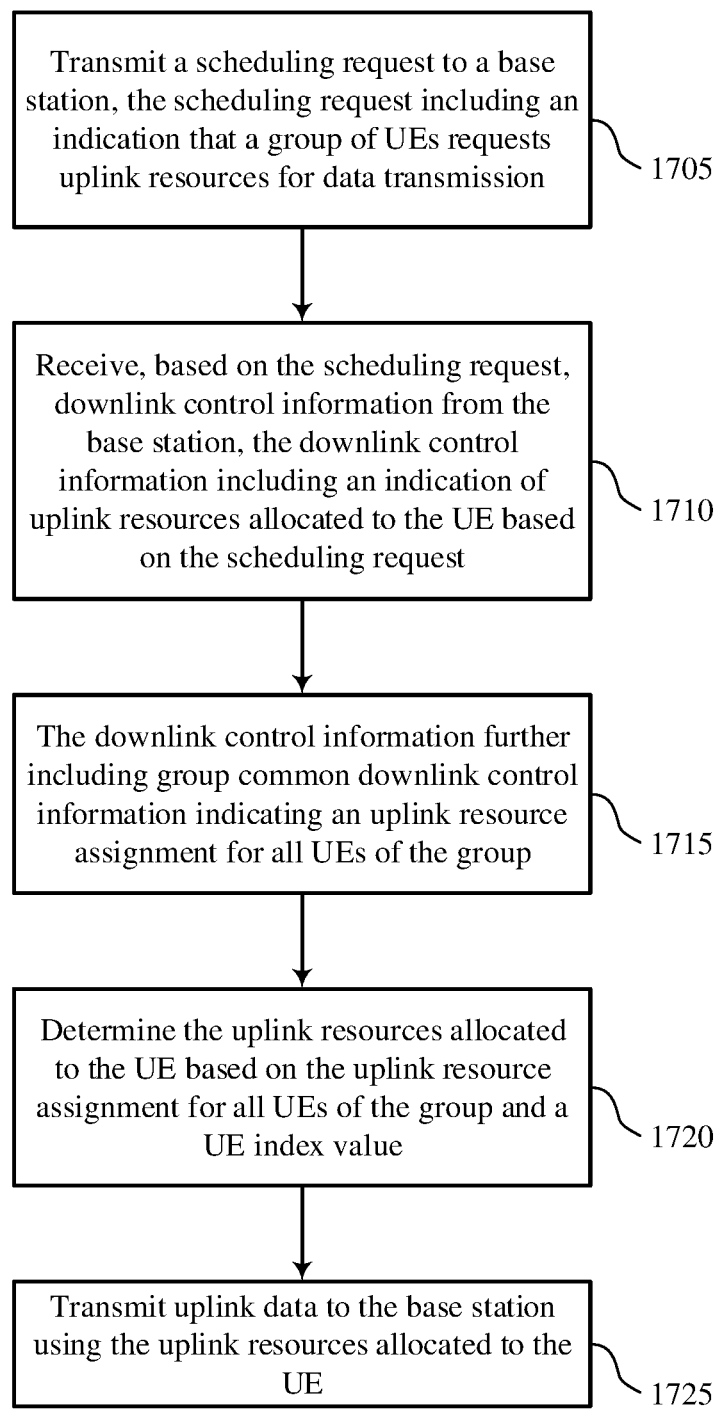

FIG. 17 shows a flowchart illustrating a method 1700 that supports group scheduling requests and resource assignments in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1705, the UE may transmit a scheduling request to a base station, the scheduling request including an indication that a group of UEs request uplink resources for data transmission. The operations of 1705 may be performed according to the methods described herein. In some examples, aspects of the operations of 1705 may be performed by a SR transmission component as described with reference to FIGS. 6 through 9.

At 1710, the UE may receive, based on the scheduling request, downlink control information from the base station, the downlink control information including an indication of uplink resources allocated to the UE based on the scheduling request. The operations of 1710 may be performed according to the methods described herein. In some examples, aspects of the operations of 1710 may be performed by a DCI processing component as described with reference to FIGS. 6 through 9.

At 1715, the UE may the downlink control information includes group common downlink control information indicating an uplink resource assignment for all UEs of the group. The operations of 1715 may be performed according to the methods described herein. In some examples, aspects of the operations of 1715 may be performed by a DCI processing component as described with reference to FIGS. 6 through 9.

At 1720, the UE may determine the uplink resources allocated to the UE based on the uplink resource assignment for all UEs of the group and an index of the UE. The operations of 1720 may be performed according to the methods described herein. In some examples, aspects of the operations of 1720 may be performed by an uplink resource identification module as described with reference to FIGS. 6 through 9.

At 1725, the UE may transmit uplink data to the base station using the uplink resources allocated to the UE. The operations of 1725 may be performed according to the methods described herein. In some examples, aspects of the operations of 1725 may be performed by an uplink data transmission module as described with reference to FIGS. 6 through 9.

Figure 18:
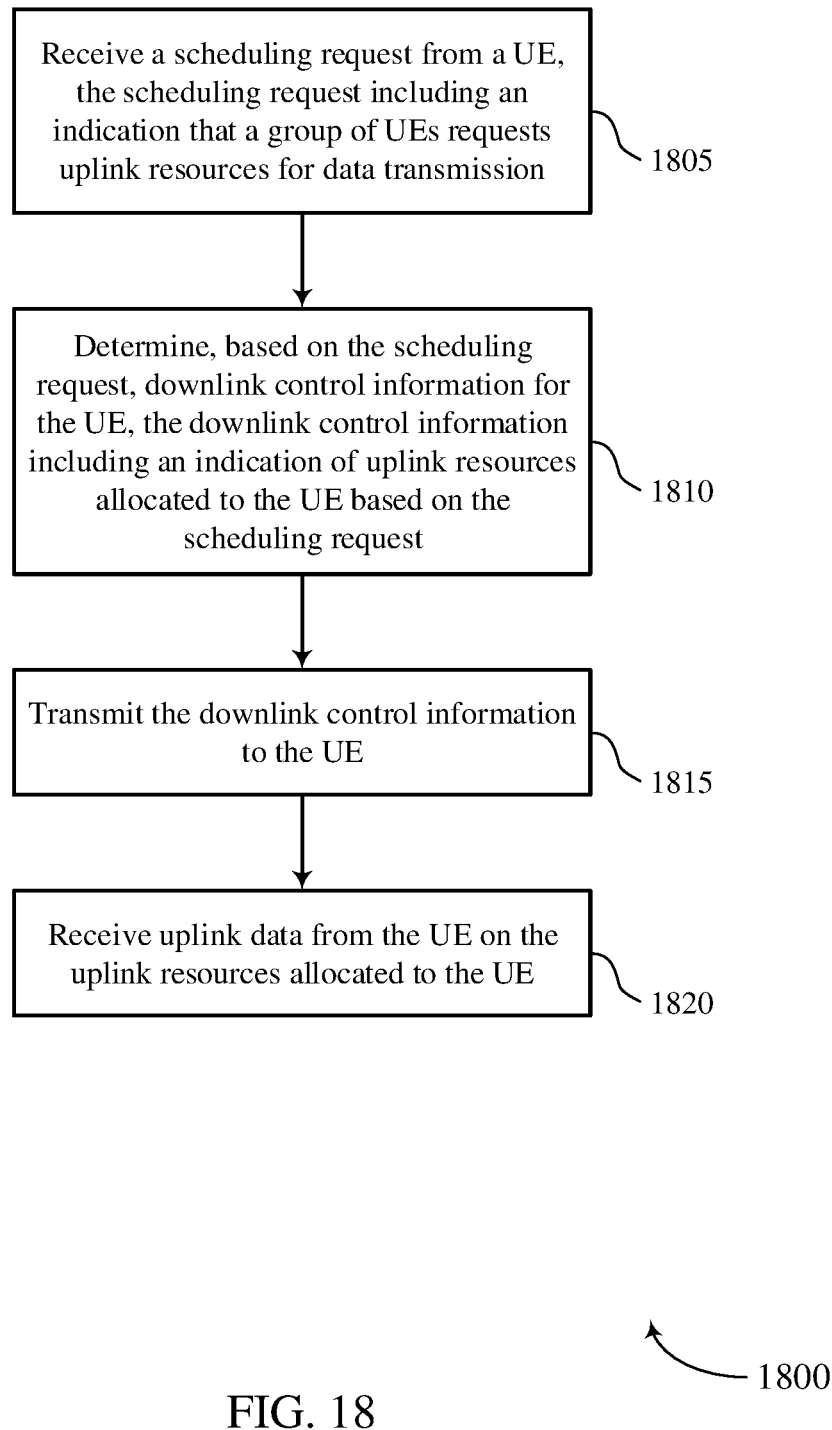

FIG. 18 shows a flowchart illustrating a method 1800 that supports group scheduling requests and resource assignments in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1805, the base station may receive a scheduling request from a UE, the scheduling request including an indication that a group of UEs request uplink resources for data transmission. The operations of 1805 may be performed according to the methods described herein. In some examples, aspects of the operations of 1805 may be performed by a SR receiving component as described with reference to FIGS. 10 through 13.

At 1810, the base station may determine, based on the scheduling request, downlink control information for the UE, the downlink control information including an indication of uplink resources allocated to the UE based on the scheduling request. The operations of 1810 may be performed according to the methods described herein. In some examples, aspects of the operations of 1810 may be performed by a DCI component as described with reference to FIGS. 10 through 13.

At 1815, the base station may transmit the downlink control information to the UE. The operations of 1815 may be performed according to the methods described herein. In some examples, aspects of the operations of 1815 may be performed by a DCI component as described with reference to FIGS. 10 through 13.

At 1820, the base station may receive uplink data from the UE on the uplink resources allocated to the UE. The operations of 1820 may be performed according to the methods described herein. In some examples, aspects of the operations of 1820 may be performed by an uplink data receiving module as described with reference to FIGS. 10 through 13.

The following provides an overview of aspects of the present disclosure:

Aspect 1: A method for wireless communications at a user equipment (UE), comprising: transmitting a scheduling request to a base station, the scheduling request comprising an indication that a group of UEs request uplink resources for data transmission; receiving, based at least in part on the scheduling request, downlink control information from the base station, the downlink control information comprising an indication of uplink resources allocated to the UE based at least in part on the scheduling request; and transmitting uplink data to the base station using the uplink resources allocated to the UE.

Aspect 2: The method of aspect 1, further comprising: identifying a set of dedicated uplink resources for scheduling requests associated with group scheduling, wherein the scheduling request is transmitted to the base station using at least one scheduling request resource of the identified set of dedicated scheduling request resources.

Aspect 3: The method of aspect 2, wherein identifying the set of dedicated uplink resources for scheduling requests associated with group scheduling comprises: receiving a radio resource control (RRC) message configuring the set of dedicated uplink resources for scheduling requests associated with group scheduling.

Aspect 4: The method of any one of aspects 1 through 3, further comprising: including a group scheduling indication in the scheduling request.

Aspect 5: The method of aspect 4, wherein the group scheduling indication comprises a set of one or more scheduling mode indicator bits associated with group scheduling.

Aspect 6: The method of any one of aspects 4 or 5, further comprising: generating the group scheduling indication by applying a cyclic shift associated with group scheduling to a base sequence; wherein the scheduling request is transmitted based at least in part on the base sequence and the cyclic shift.

Aspect 7: The method of any one of aspects 4 through 6, further comprising generating the group scheduling indication by multiplying a base sequence by a complex-value multiplier associated with group scheduling; wherein the scheduling request is transmitted based at least in part on the base sequence and the complex-value multiplier.

Aspect 8: The method of any one of aspects 4 through 7, further comprising wherein the group scheduling indication comprises an identifier of the group of UEs.

Aspect 9: The method of any one of aspects 1 through 8, wherein the downlink control information comprises group common downlink control information indicating an uplink resource assignment for all UEs of the group of UEs.

Aspect 10: The method of aspect 9, further comprising: determining uplink resources allocated to the UE based at least in part on the uplink resource assignment for all UEs of the group of UEs and an index of the UE.

Aspect 11: The method of any one of aspects 9 or 10, wherein receiving the group common downlink control information further comprises: unscrambling a set of cyclic redundancy check bits based at least in part on a group common radio network temporary identifier (GC-RNTI).

Aspect 12: The method of any one of aspects 9 through 11, wherein the group common downlink control information indicates a multiplexing scheme comprising a multi-slot scheduling scheme wherein each UE of the group of UEs is allocated uplink resources from a different slot of the uplink resource assignment for all UEs of the group of UEs.

Aspect 13: The method of any one of aspects 9 through 12, wherein the group common downlink control information indicates a multiplexing scheme comprising a multiple user multiple input multiple output spatial multiplexing scheme, wherein each UE of the group of UEs is associated with a separate orthogonal code domain multiplexed demodulation reference signal.

Aspect 14: The method of any one of aspects 1 through 13, further comprising: transmitting a buffer status report on a portion of the uplink resources allocated to the UE.

Aspect 15: A method for wireless communications at a base station, comprising: receiving a scheduling request from a user equipment (UE), the scheduling request comprising an indication that a group of UEs request uplink resources for data transmission; determining, based at least in part on the scheduling request, downlink control information for the UE, the downlink control information comprising an indication of uplink resources allocated to the UE based at least in part on the scheduling request; transmitting the downlink control information to the UE; and receiving uplink data from the UE on the uplink resources allocated to the UE.

Aspect 16: The method of aspect 15, further comprising: identifying a set of dedicated uplink resources for scheduling requests associated with group scheduling; transmitting, to the UE, an indication of the set of dedicated uplink resources for scheduling requests associated with group scheduling; and receiving the scheduling request from the UE on at least one scheduling request resource of the identified set of dedicated scheduling request resources.

Aspect 17: The method of aspect 16, wherein transmitting the indication of the set of dedicated uplink resources for scheduling requests associated with group scheduling comprises: transmitting a radio resource control (RRC) message configuring the set of dedicated uplink resources for scheduling requests associated with group scheduling.

Aspect 18: The method of any one of aspects 16 or 17, further comprising: receiving a group scheduling indication in the scheduling request.

Aspect 19: The method of aspect 18, wherein the group scheduling indication comprises a set of one or more scheduling mode indicator bits associated with group scheduling.

Aspect 20: The method of any one of aspects 18 or 19, further comprising: receiving the scheduling request based at least in part on a base sequence and a cyclic shift associated with group scheduling applied to scheduling request at the UE.

Aspect 21: The method of any one of aspects 18 through 20 further comprising: receiving the scheduling request based at least in part on a base sequence and complex-value multiplier associated with group scheduling used to generate the group scheduling information at the UE.

Aspect 22: The method of any one of aspects 18 through 21 wherein the group scheduling indication comprises an identifier of the group of UEs.

Aspect 23: The method of any one of aspects 15 through 21, wherein the downlink control information comprises group common downlink control information indicating an uplink resource assignment for all UEs of the group of UEs.

Aspect 24: The method of aspect 23, wherein uplink resources allocated to the UE are indicated based at least in part on the uplink resource assignment for all UEs of the group of UEs and an index of the UE.

Aspect 25: The method of any one of aspects 23 or 24, wherein transmitting the group common downlink control information further comprises: scrambling a set of cyclic redundancy check bits based at least in part on a group common radio network temporary identifier (GC-RNTI).

Aspect 26: The method of any one of aspects 23 through 25, wherein the group common downlink control information indicates a multiplexing scheme comprising a multi-slot scheduling scheme wherein each UE of the group of UEs is allocated uplink resources from a different slot of the uplink resource assignment for all UEs of the group of UEs.

Aspect 27: The method of any one of aspects 23 through 26 wherein the group common downlink control information indicates a multiplexing scheme comprising a multiple user multiple input multiple output spatial multiplexing scheme, wherein each UE of the group of UEs is associated with a separate orthogonal code domain multiplexed demodulation reference signal.

Aspect 28: The method of any one of aspects 15 through 25 further comprising: receiving a buffer status report on a portion of the uplink resources allocated to the UE.

Aspect 29: An apparatus for wireless communications at a user equipment (UE) comprising at least one means for performing a method of any one of aspects 1 through 14.

Aspect 30: An apparatus for wireless communications at a user equipment (UE) comprising a processor; memory coupled with the processor; and instructions stored in the memory and executable by the processor to cause the apparatus to perform a method of any one of aspects 1 through 14.

Aspect 31: A non-transitory computer-readable medium storing code for wireless communications at a user equipment (UE) the code comprising instructions executable by a processor to perform a method of any one of aspects 1 through 14.

Aspect 32: An apparatus comprising at least one means for performing a method of any one of aspects 15 through 27.

Aspect 33: An apparatus comprising a processor; memory coupled with the processor; and instructions stored in the memory and executable by the processor to cause the apparatus to perform a method of any one of aspects 15 through 27.

Aspect 34: A non-transitory computer-readable medium storing code the code comprising instructions executable by a processor to perform a method of any one of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   transmitting a scheduling request to a network device, the scheduling request comprising a group scheduling indication comprising a set of one or more scheduling mode indicator bits associated with group scheduling, wherein the group scheduling indication corresponds to a group of UEs including at least the first UE and a second UE that request uplink resources for data transmission;
   receiving, based at least in part on the scheduling request, downlink control information comprising an indication of uplink resources allocated to the first UE based at least in part on the scheduling request; and
   transmitting uplink data via the uplink resources allocated to the first UE.

2. The method of claim 1, wherein transmitting the scheduling request comprises:
   transmitting the scheduling request via at least one scheduling request resource of a set of dedicated uplink resources for scheduling requests associated with the group scheduling.

3. The method of claim 2, further comprising:
   receiving a radio resource control (RRC) message configuring the set of dedicated uplink resources for scheduling requests associated with the group scheduling.

4. The method of claim 1, further comprising:
   generating the group scheduling indication by applying a cyclic shift associated with the group scheduling to a base sequence, wherein the scheduling request is transmitted based at least in part on the base sequence and the cyclic shift.

5. The method of claim 1, further comprising:
   generating the group scheduling indication by multiplying a base sequence by a complex-value multiplier associated with the group scheduling, wherein the scheduling request is transmitted based at least in part on the base sequence and the complex-value multiplier.

6. The method of claim 1, wherein the group scheduling indication comprises an identifier of the group of UEs.

7. The method of claim 1, wherein the downlink control information comprises group common downlink control information indicating an uplink resource assignment for all UEs of the group of UEs.

8. The method of claim 7,
   wherein the uplink resources allocated to the first UE are based at least in part on the uplink resource assignment for all UEs of the group of UEs and an index of the first UE.

9. The method of claim 7, wherein receiving the group common downlink control information further comprises:
   unscrambling a set of cyclic redundancy check bits based at least in part on a group common radio network temporary identifier (GC-RNTI).

10. The method of claim 7, wherein the group common downlink control information indicates a multiplexing scheme comprising a multi-slot scheduling scheme wherein each UE of the group of UEs is allocated uplink resources from a different slot of the uplink resource assignment for all UEs of the group of UEs.

11. The method of claim 7, wherein the group common downlink control information indicates a multiplexing scheme comprising a multiple user multiple input multiple output spatial multiplexing scheme, wherein each UE of the group of UEs is associated with a separate orthogonal code domain multiplexed demodulation reference signal.

12. The method of claim 1, further comprising:
   transmitting a buffer status report on a portion of the uplink resources allocated to the first UE.

13. A method for wireless communications at a network device, comprising:
   receiving a scheduling request from a first user equipment (UE), the scheduling request comprising a group scheduling indication comprising a set of one or more scheduling mode indicator bits associated with group scheduling, wherein the group scheduling indication corresponds to a group of UEs including at least the first UE and a second UE that request uplink resources for data transmission;
   transmitting downlink control information for the first UE, the downlink control information comprising an indication of the uplink resources allocated to the first UE based at least in part on the scheduling request; and
   receiving uplink data from the first UE via the uplink resources allocated to the first UE.

14. The method of claim 13, further comprising:
   transmitting, to the first UE, an indication of a set of dedicated uplink resources for scheduling requests associated with the group scheduling; and
   receiving the scheduling request from the first UE on at least one scheduling request resource of the set of dedicated uplink resources.

15. The method of claim 14, wherein transmitting the indication of the set of dedicated uplink resources for scheduling requests associated with the group scheduling comprises:
   transmitting a radio resource control (RRC) message configuring the set of dedicated uplink resources for scheduling requests associated with the group scheduling.

16. The method of claim 13, further comprising:
   receiving the scheduling request based at least in part on a base sequence and a cyclic shift associated with the group scheduling applied to the scheduling request at the first UE.

17. The method of claim 13, further comprising:
   receiving the scheduling request based at least in part on a base sequence and complex-value multiplier associated with the group scheduling used to generate group scheduling information at the first UE.

18. The method of claim 13, wherein the group scheduling indication comprises an identifier of the group of UEs.

19. The method of claim 13, wherein the downlink control information comprises group common downlink control information indicating an uplink resource assignment for all UEs of the group of UEs.

20. The method of claim 19, wherein uplink resources allocated to the first UE are indicated based at least in part on the uplink resource assignment for all UEs of the group of UEs and an index of the first UE.

21. The method of claim 19, wherein transmitting the group common downlink control information further comprises:
scrambling a set of cyclic redundancy check bits based at least in part on a group common radio network temporary identifier (GC-RNTI).

22. The method of claim 19 wherein the group common downlink control information indicates a multiplexing scheme comprising a multi-slot scheduling scheme wherein each UE of the group of UEs is allocated uplink resources from a different slot of the uplink resource assignment for all UEs of the group of UEs.

23. The method of claim 19, wherein the group common downlink control information indicates a multiplexing scheme comprising a multiple user multiple input multiple output spatial multiplexing scheme, wherein each UE of the group of UEs is associated with a separate orthogonal code domain multiplexed demodulation reference signal.

24. The method of claim 13, further comprising:
receiving a buffer status report on a portion of the uplink resources allocated to the first UE.

25. An apparatus for wireless communications at a first user equipment (UE), comprising:
one or more processors,
one or more memories coupled with the one or more processors; and
instructions stored in the one or more memories and executable by the one or more processors to cause the apparatus to:
transmit a scheduling request to a network device, the scheduling request comprising a group scheduling indication comprising a set of one or more scheduling mode indicator bits associated with group scheduling, wherein the group scheduling indication corresponds to a group of UEs including at least the first UE and a second UE that request uplink resources for data transmission;
receive, based at least in part on the scheduling request, downlink control information comprising an indication of uplink resources allocated to the UE based at least in part on the scheduling request; and
transmit uplink data via the uplink resources allocated to the first UE.

26. An apparatus for wireless communications at a network device, comprising:
one or more processors,
one or more memories coupled with the one or more processors; and
instructions stored in the one or more memories and executable by the one or more processors to cause the apparatus to:
receive a scheduling request from a first user equipment (UE), the scheduling request comprising a group scheduling indication comprising a set of one or more scheduling mode indicator bits associated with group scheduling, wherein the group scheduling indication corresponds to a group of UEs including at least the first UE and a second UE that request uplink resources for data transmission;
transmitting downlink control information for the first UE, the downlink control information comprising an indication of uplink resources allocated to the first UE based at least in part on the scheduling request; and
receive uplink data from the first UE via the uplink resources allocated to the first UE.

\* \* \* \* \*